US011442836B2

(12) United States Patent
Moser et al.

(10) Patent No.: US 11,442,836 B2
(45) Date of Patent: Sep. 13, 2022

(54) METHOD AND SYSTEM FOR REAL-TIME CORRELATION OF DISPARATE SOURCES OF TOPOLOGICAL INFORMATION TO CREATE A UNIFIED TOPOLOGICAL MODEL OF A DISTRIBUTED INFORMATION SYSTEM

(71) Applicant: Dynatrace LLC, Waltham, MA (US)

(72) Inventors: Herwig Moser, Freistadt (AT); Michael Kopp, Piberbach (AT); Ernst Ambichl, Altenberg (AT)

(73) Assignee: Dynatrace LLC, Waltham, MA (US)

( * ) Notice: Subject to any disclaimer, the term of this patent is extended or adjusted under 35 U.S.C. 154(b) by 882 days.

(21) Appl. No.: 16/276,710

(22) Filed: Feb. 15, 2019

(65) Prior Publication Data
US 2019/0266502 A1 Aug. 29, 2019

Related U.S. Application Data

(60) Provisional application No. 62/634,393, filed on Feb. 23, 2018.

(51) Int. Cl.
| | |
|---|---|
| *G06F 11/34* | (2006.01) |
| *G06F 11/30* | (2006.01) |
| *G06N 5/02* | (2006.01) |
| *G06N 5/04* | (2006.01) |
| *G06F 11/07* | (2006.01) |

(52) U.S. Cl.
CPC ........ *G06F 11/3447* (2013.01); *G06F 11/079* (2013.01); *G06F 11/3048* (2013.01); *G06F 11/3089* (2013.01); *G06F 11/3461* (2013.01); *G06F 11/3495* (2013.01); *G06N 5/022* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 2005/0251371 A1* | 11/2005 | Chagoly | G06Q 10/0639 703/1 |
| 2009/0144409 A1* | 6/2009 | Dickerson | G06F 11/3495 709/224 |
| 2010/0296411 A1* | 11/2010 | Chambers | H04L 41/12 370/254 |

(Continued)

*Primary Examiner* — Qing Chen

(57) ABSTRACT

A system and method is disclosed for the combined analysis of transaction execution monitoring data and a topology model created from infrastructure monitoring data of computing systems involved in the execution of the monitored transactions. Monitored communication activities of transactions are analyzed to identify intermediate processing nodes between sender and receiver side and to enrich transaction monitoring data with data describing those intermediate processing nodes. The topology model may also be improved by the combined analysis, as functionality and services provided by elements of the topology model may be derived by the involvement of those elements in the execution of monitored transactions. The result of the combined analysis is used by an automated anomaly detection and causality estimation system. The combined analysis may also reveal entities of a monitored environment that are used by transaction executions but which are not monitored.

28 Claims, 17 Drawing Sheets

Cloud-Virtualization/Missing Agent Scenarios

(56) References Cited

U.S. PATENT DOCUMENTS

| | | | |
|---|---|---|---|
| 2012/0304172 A1* | 11/2012 | Greifeneder | G06F 11/3419 |
| | | | 718/1 |
| 2013/0185643 A1* | 7/2013 | Greifeneder | H04L 67/22 |
| | | | 715/736 |
| 2014/0136693 A1* | 5/2014 | Greifeneder | H04L 61/1505 |
| | | | 709/224 |
| 2014/0297846 A1* | 10/2014 | Hoja | H04L 43/10 |
| | | | 709/224 |
| 2015/0032884 A1 | 1/2015 | Greifeneder et al. | |
| 2015/0052441 A1* | 2/2015 | Degioanni | H04L 41/145 |
| | | | 715/734 |
| 2016/0105350 A1 | 4/2016 | Greifeneder et al. | |
| 2016/0283345 A1 | 9/2016 | Gounares et al. | |
| 2017/0075749 A1 | 3/2017 | Ambichl et al. | |
| 2018/0217879 A1* | 8/2018 | Garcia | G06F 11/3006 |

* cited by examiner

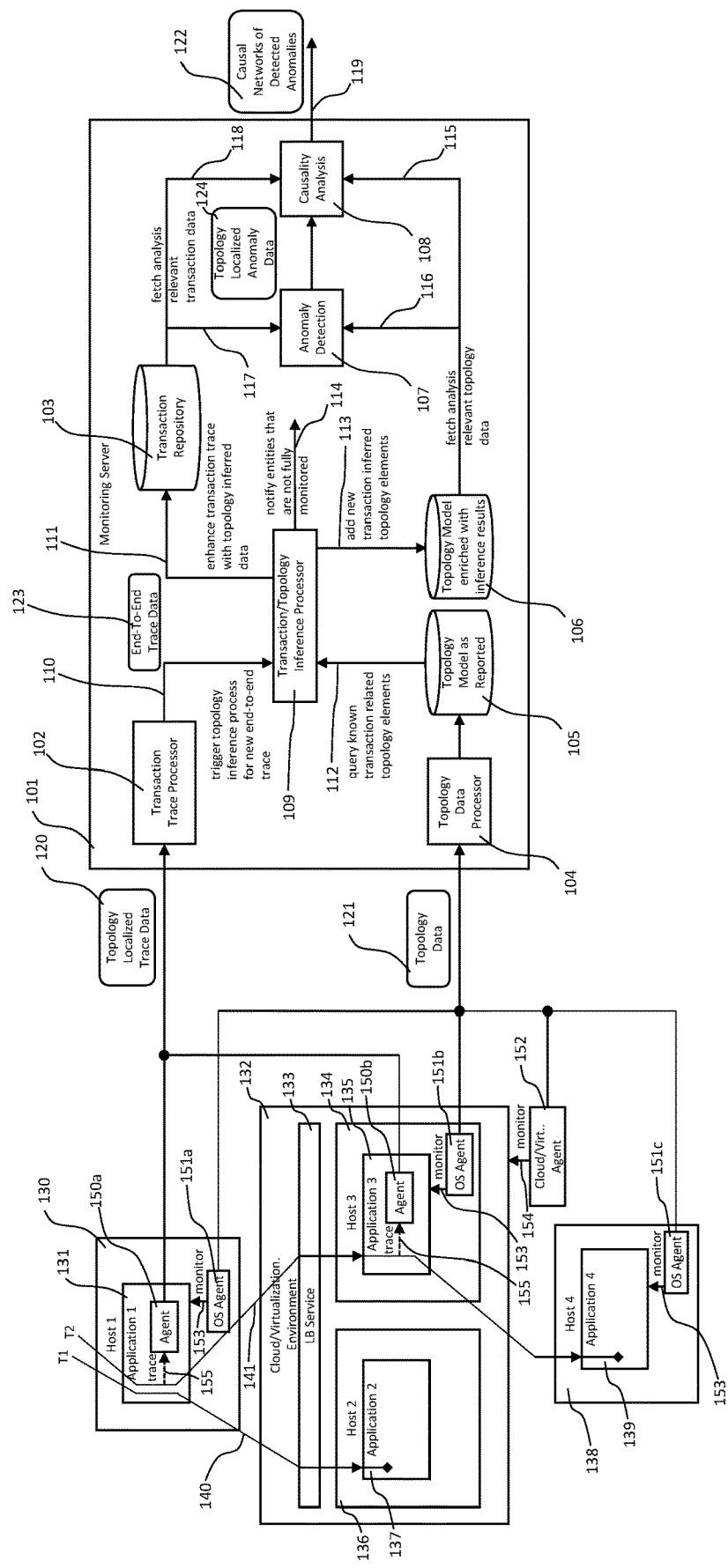
FIG 1a: Cloud-Virtualization/Missing Agent Scenarios

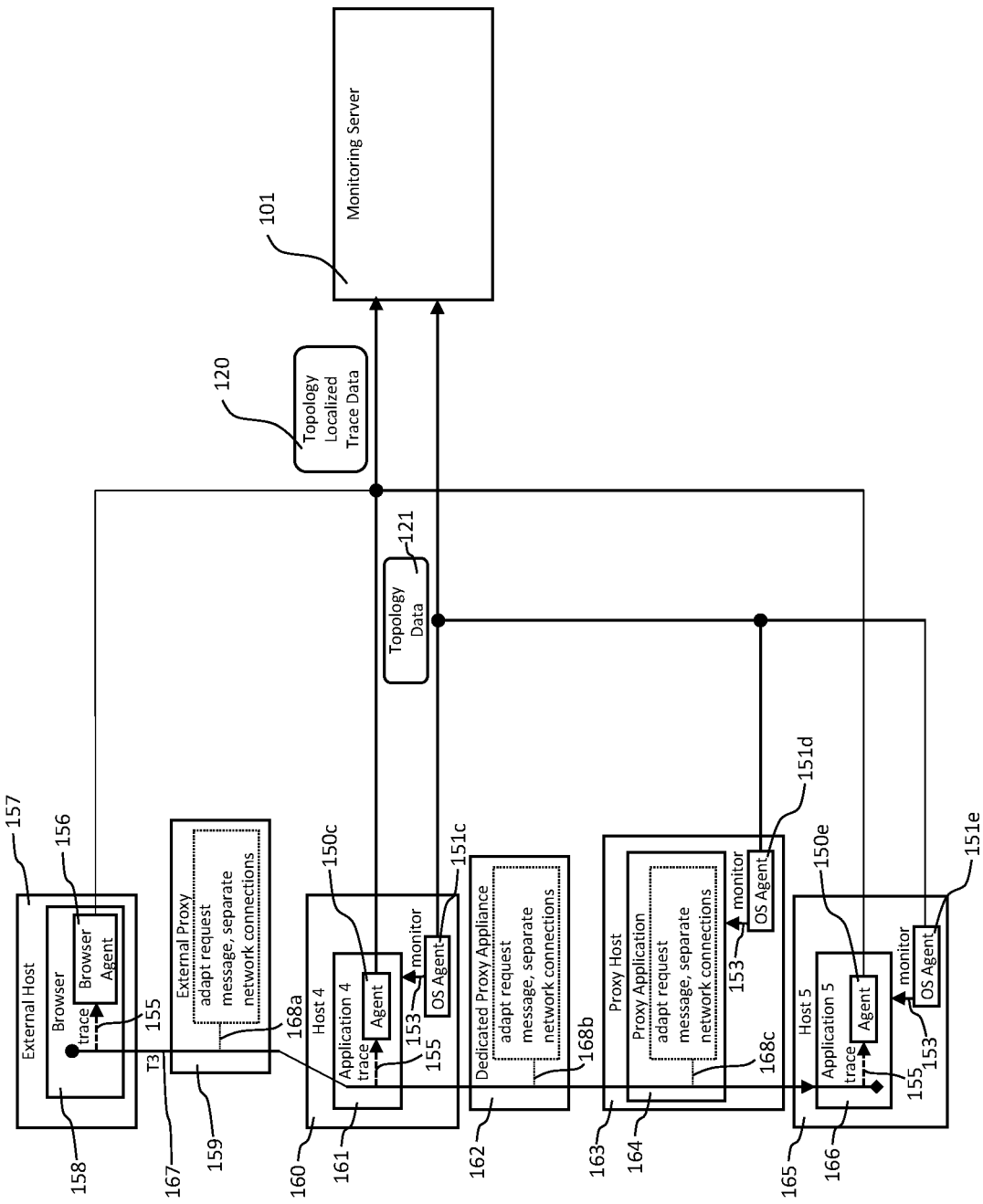

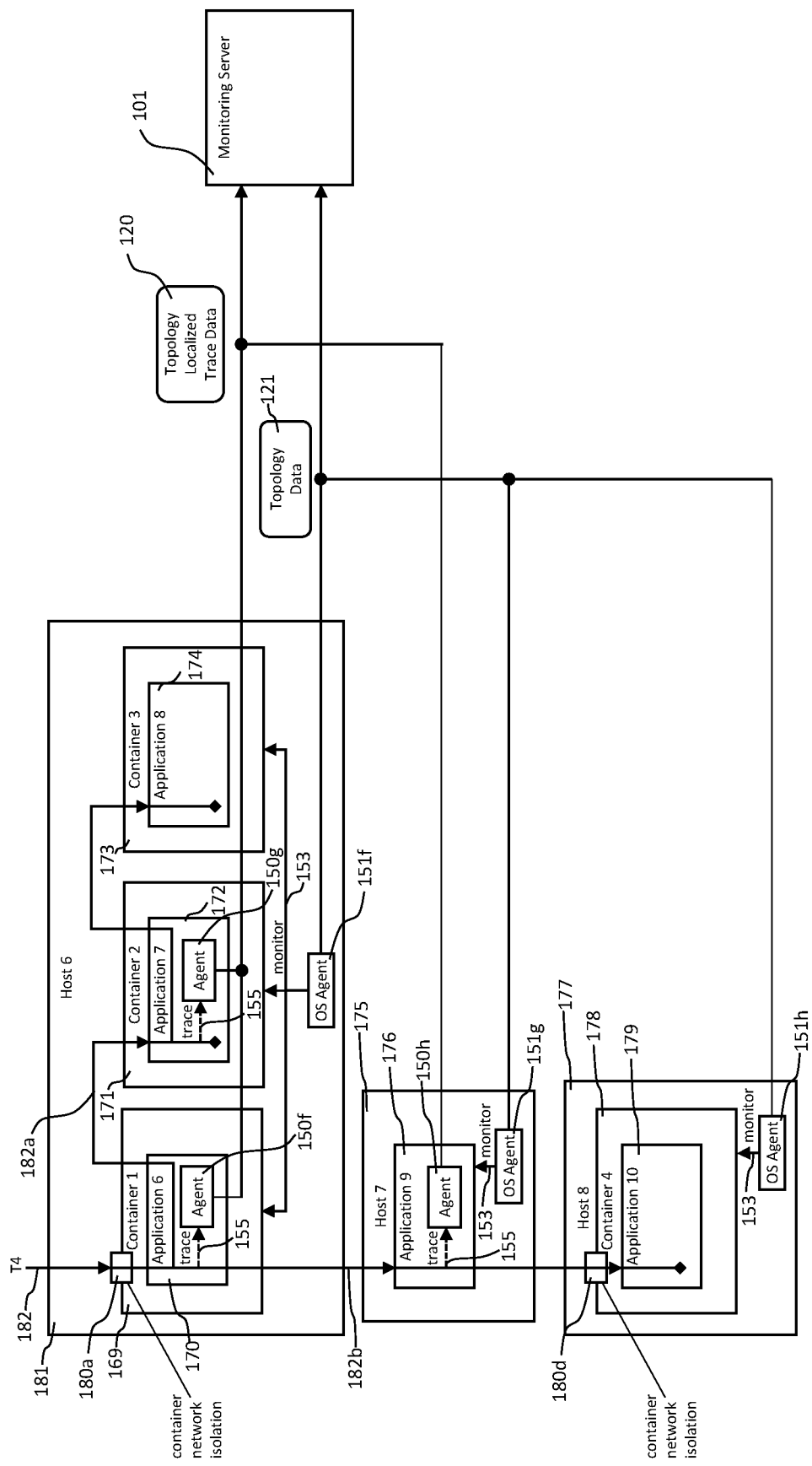

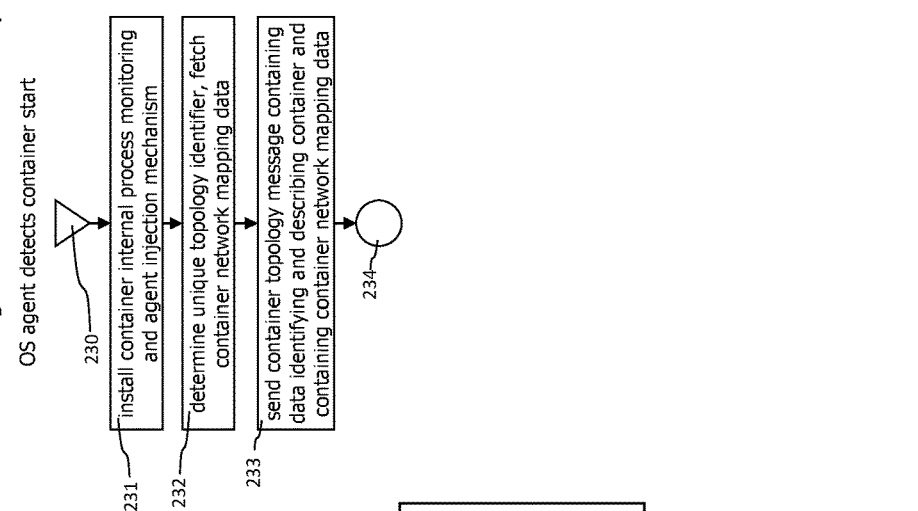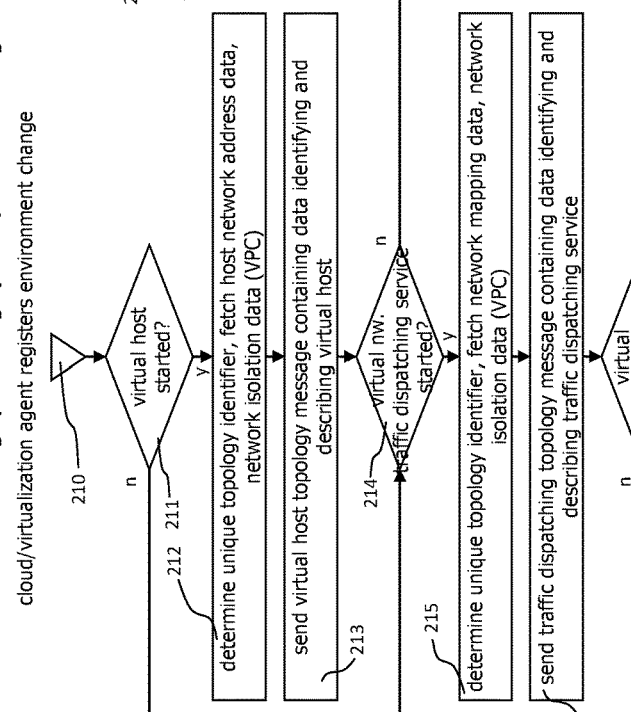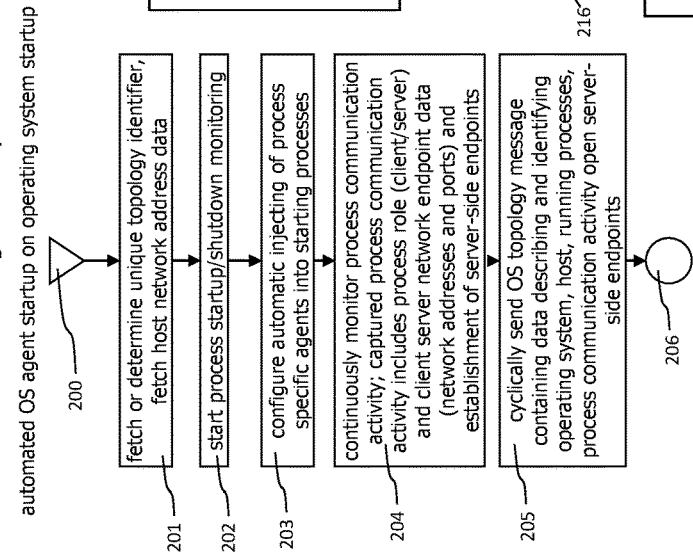

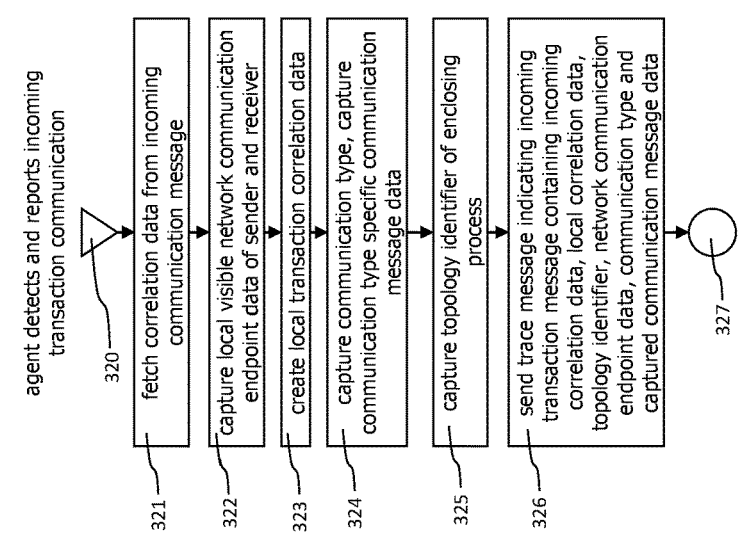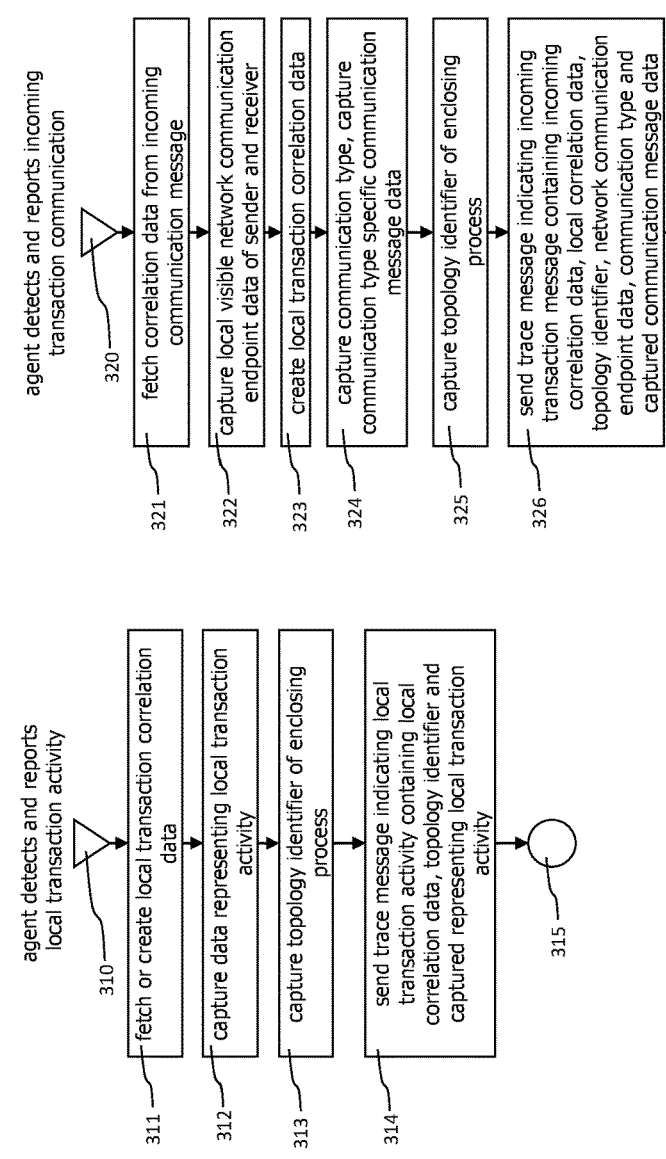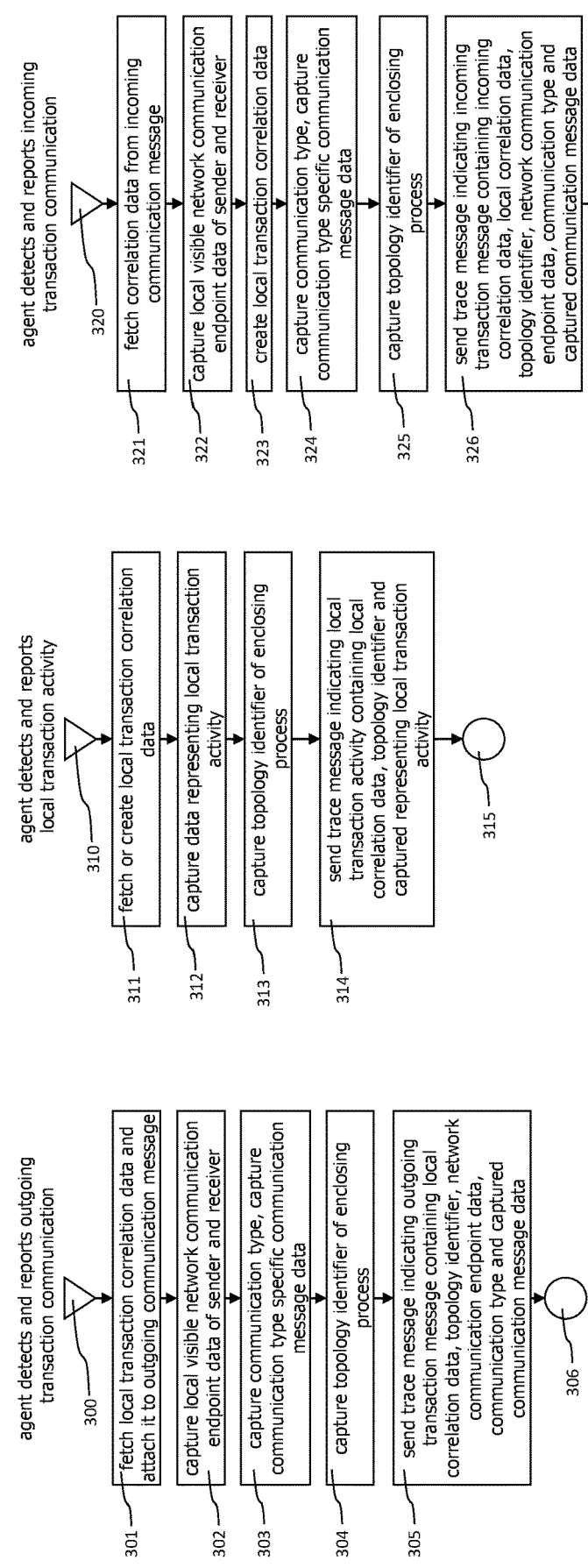

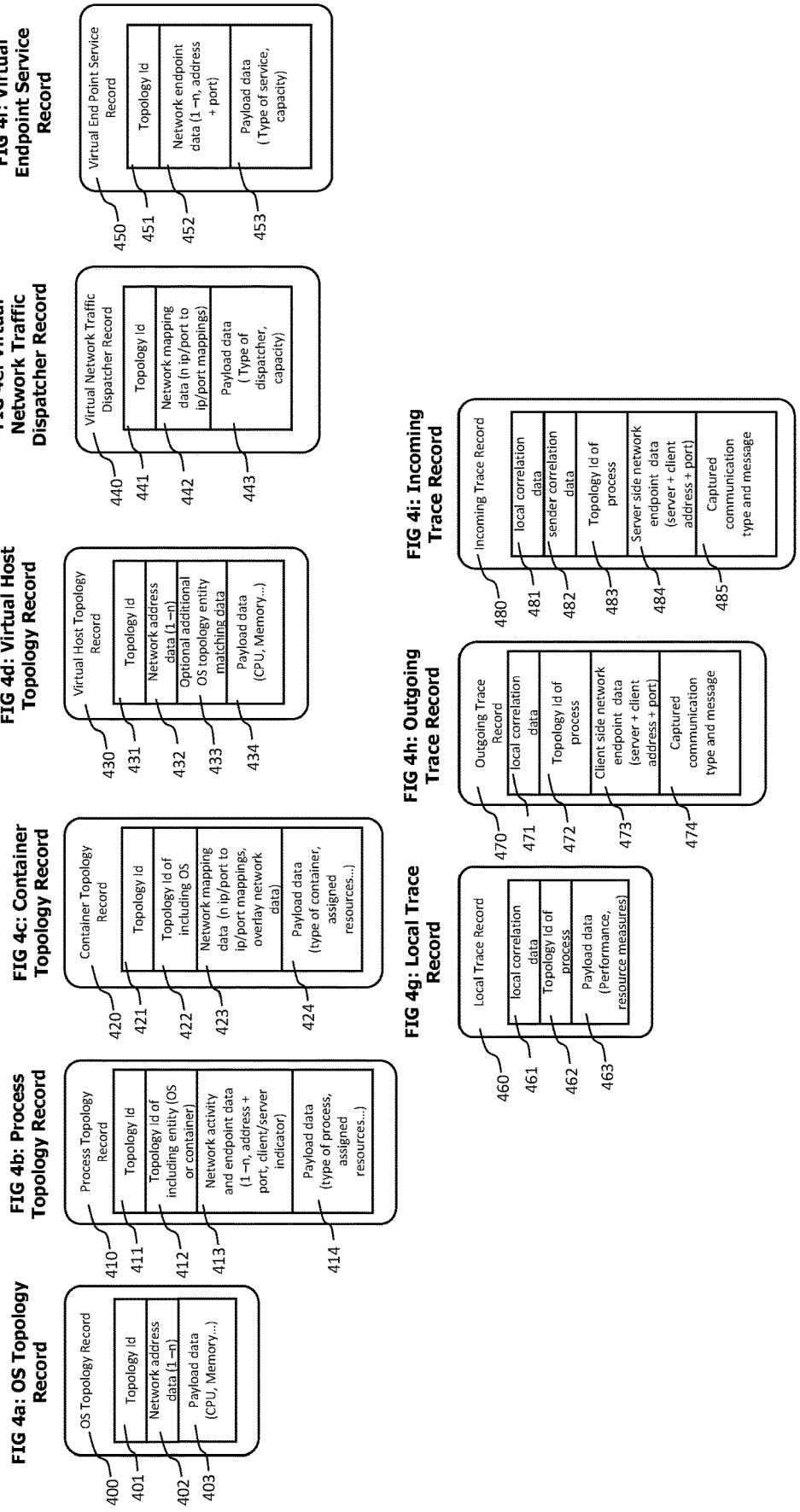

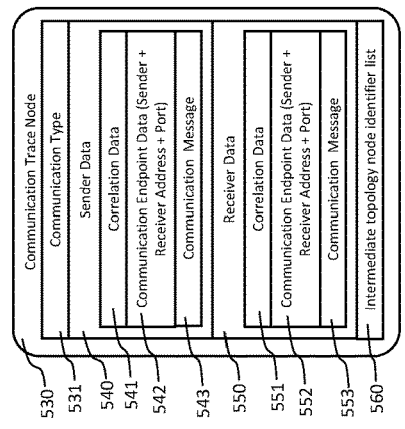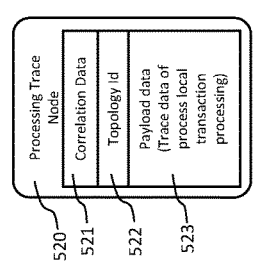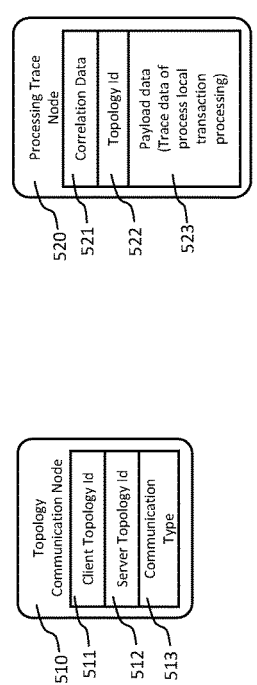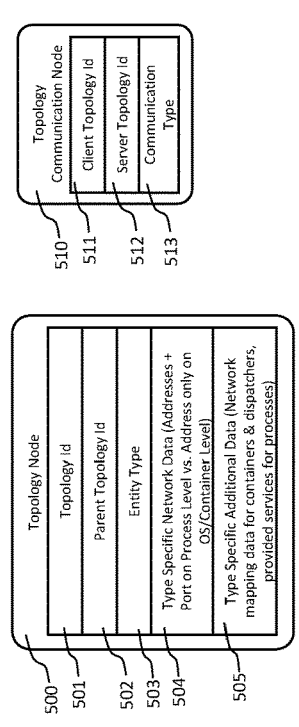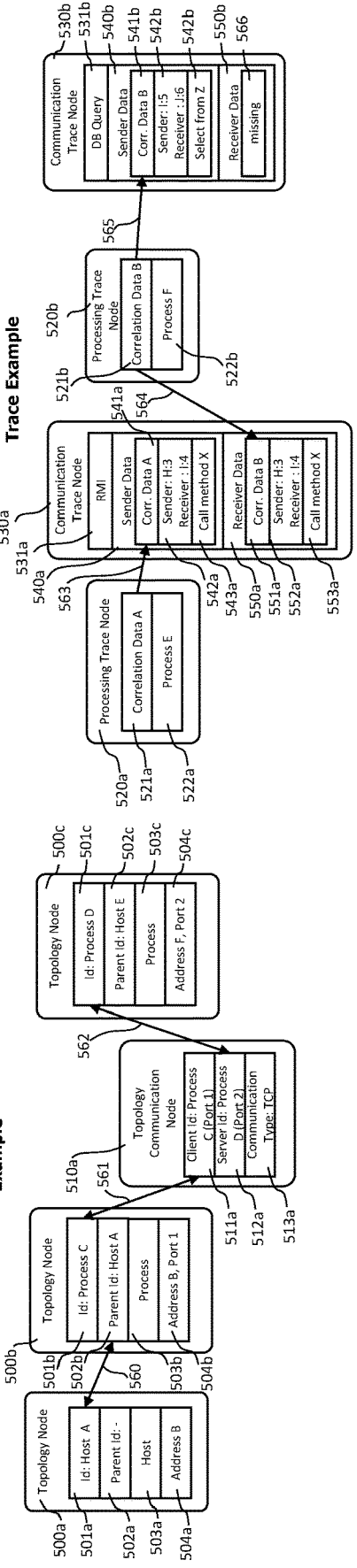

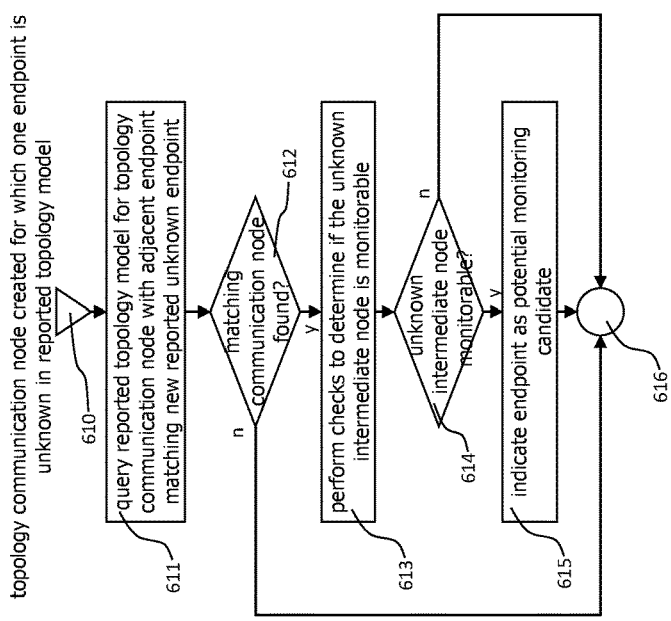
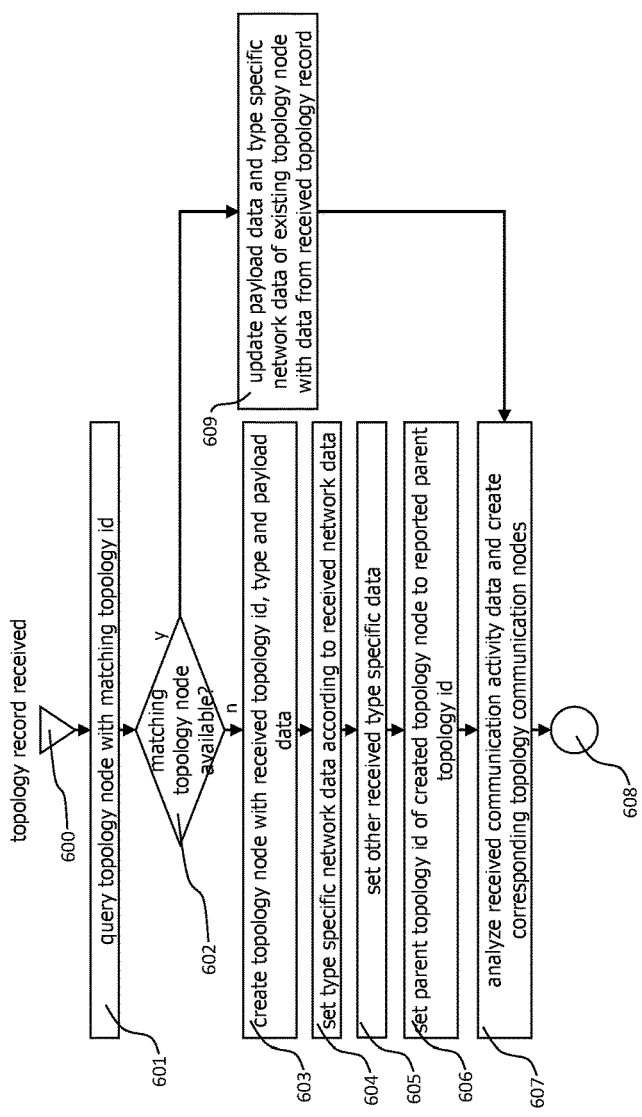

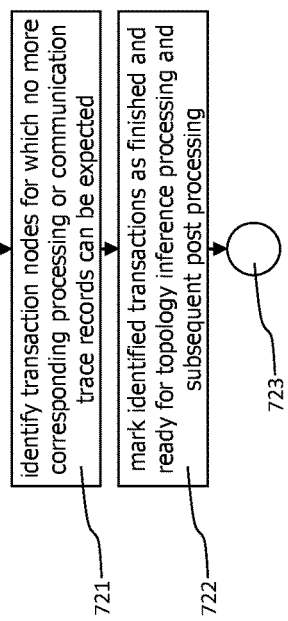
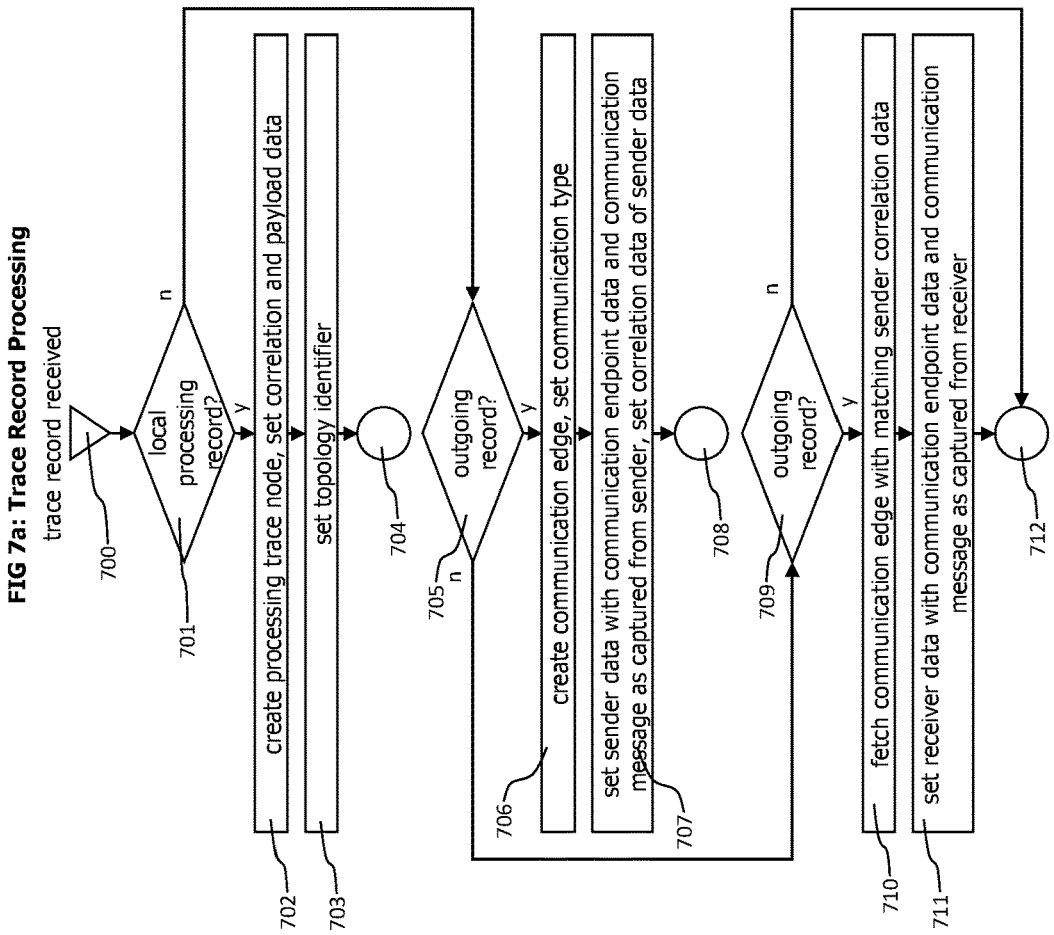

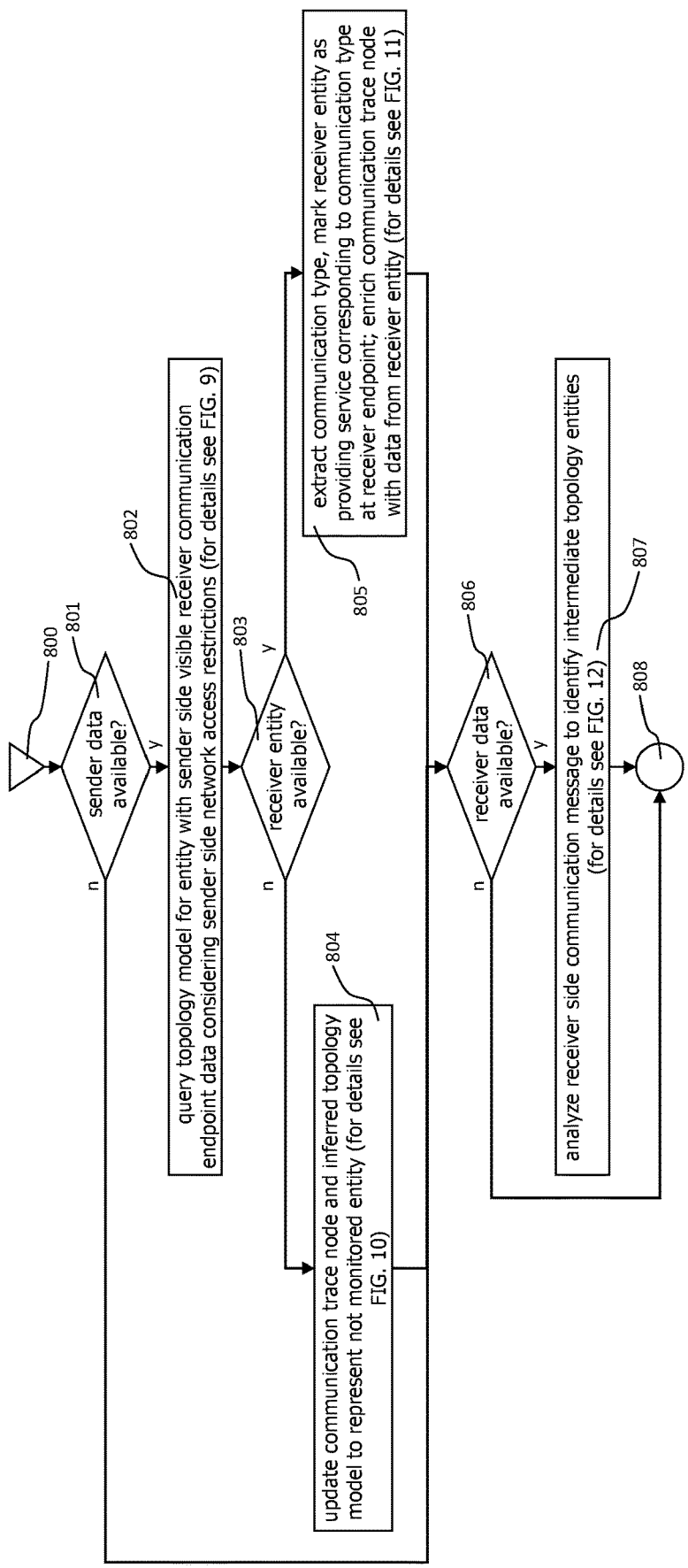

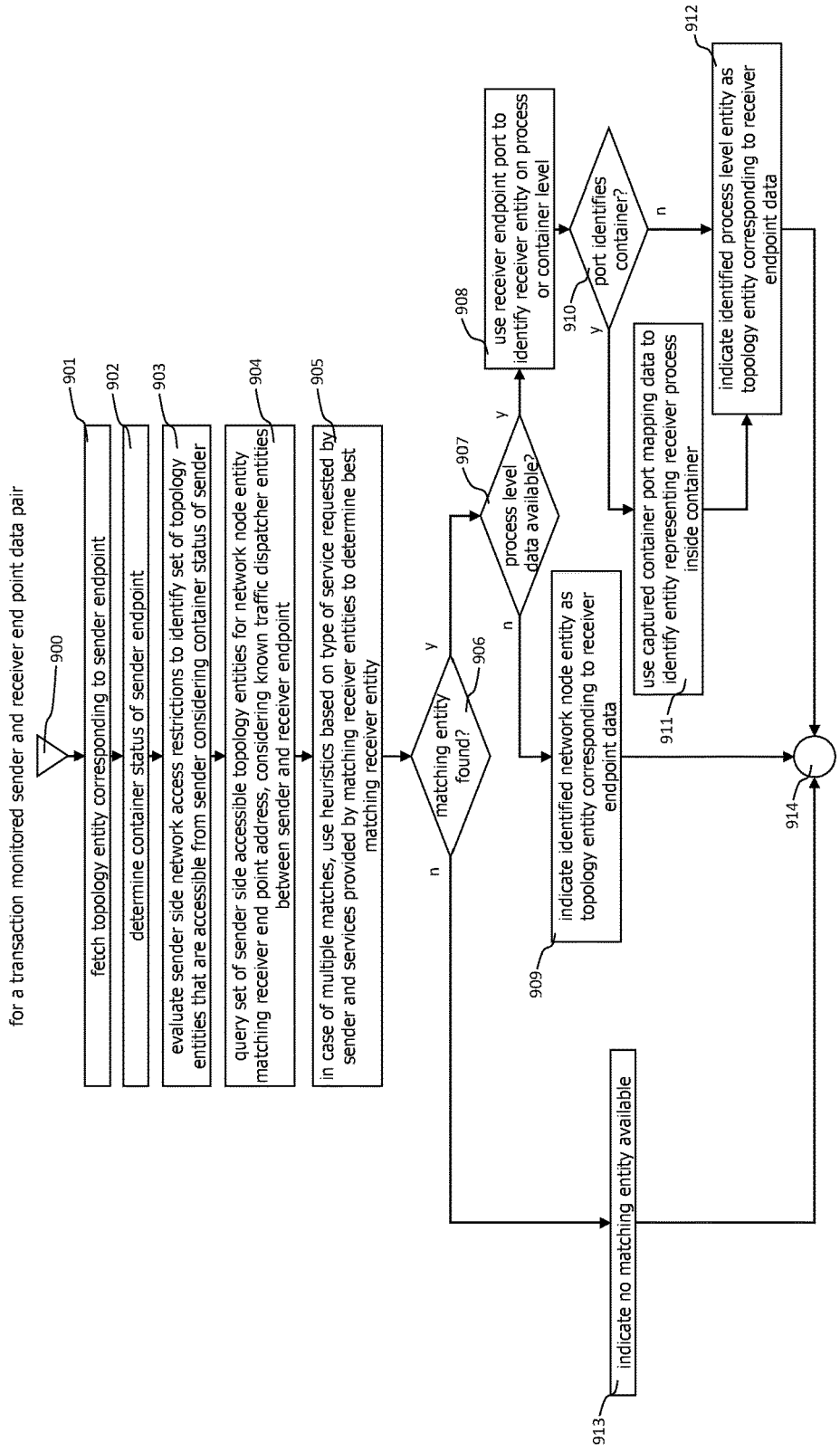
FIG 9: Query Topology Entity Corresponding to Transaction Reported Communication Receiver Endpoint Data

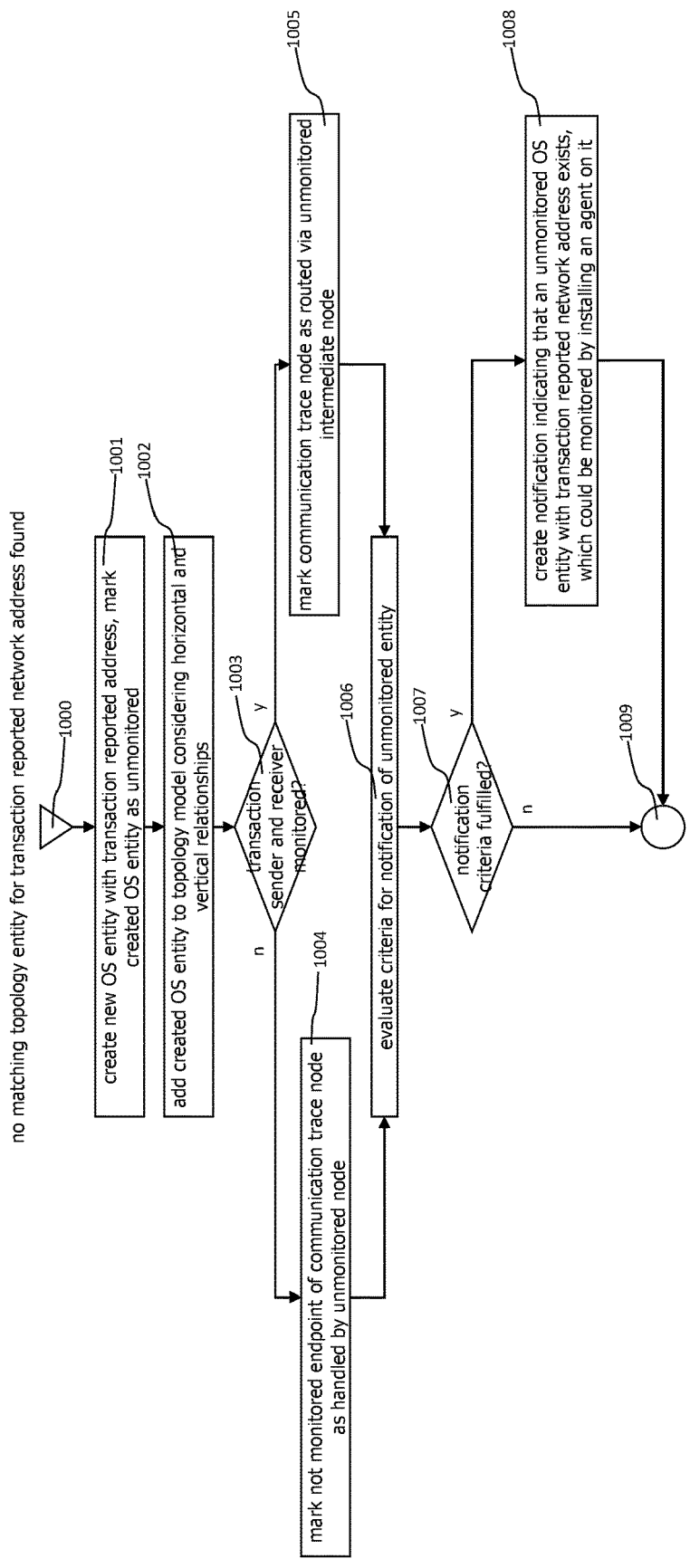
FIG 10: Handling of Unavailable Monitored Topology Entity for Transaction Reported Network Address

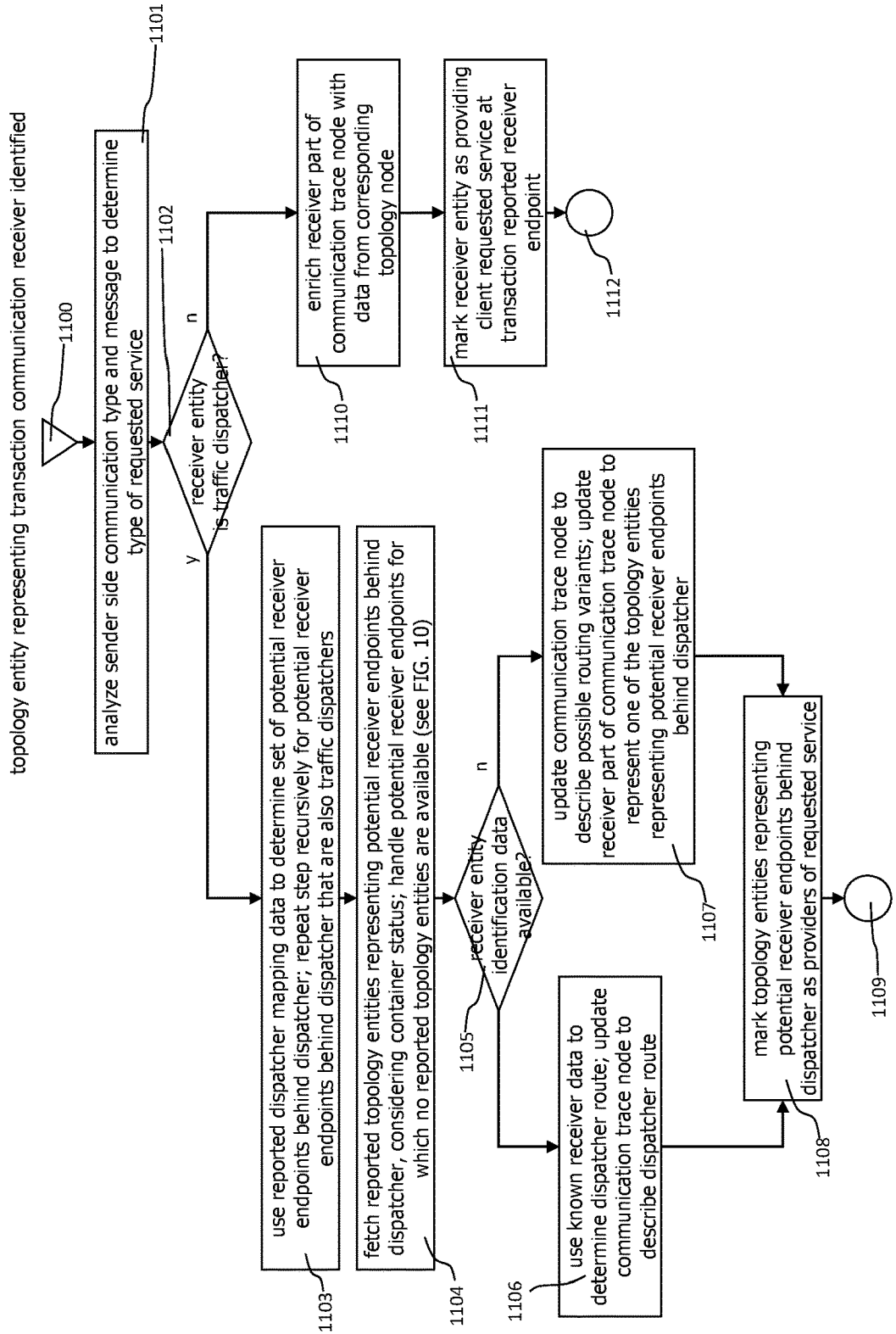
FIG 11: Topology Entity for Transaction Reported Receiver Communication Endpoint found

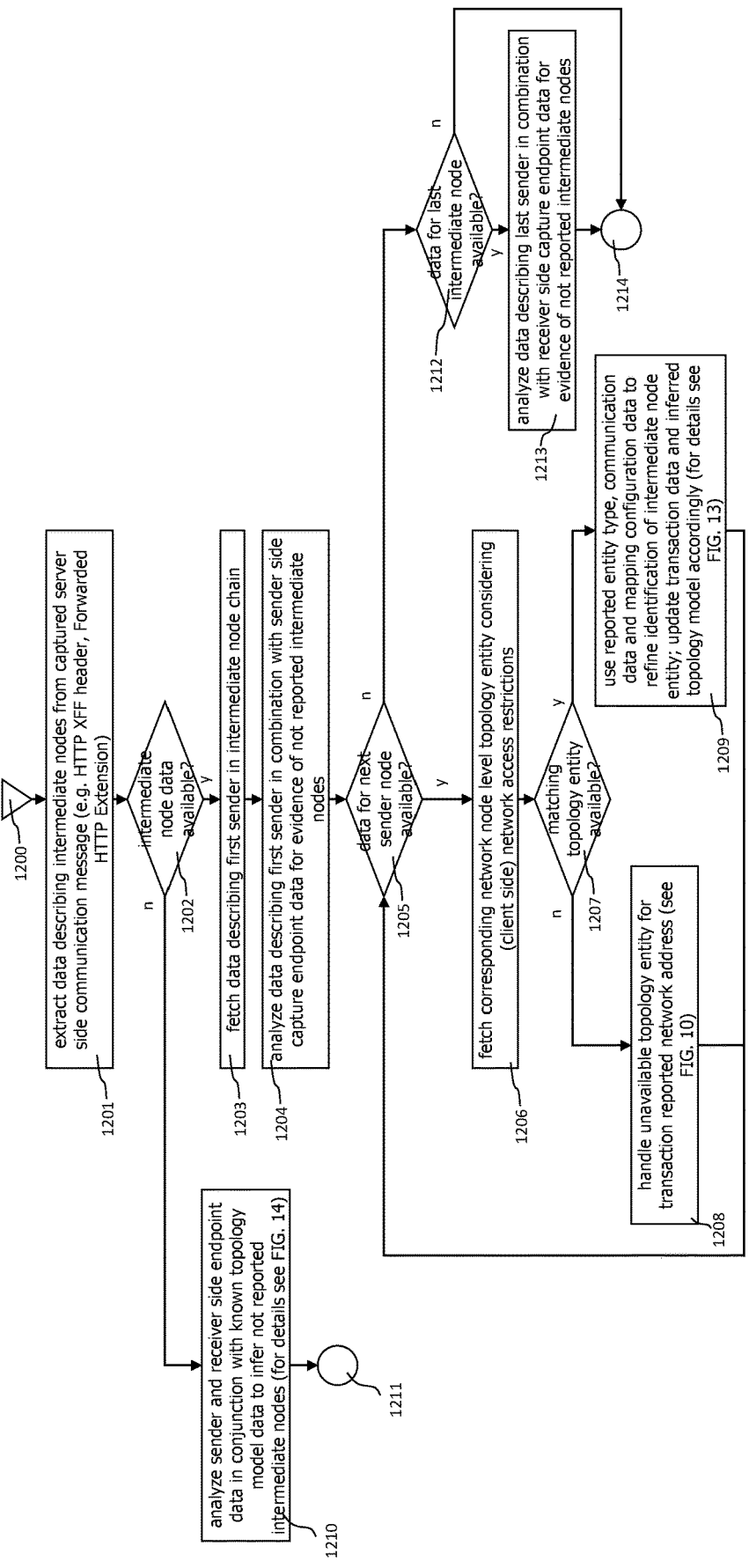
FIG 12: Analysis of Receiver Side Captured Communication Message

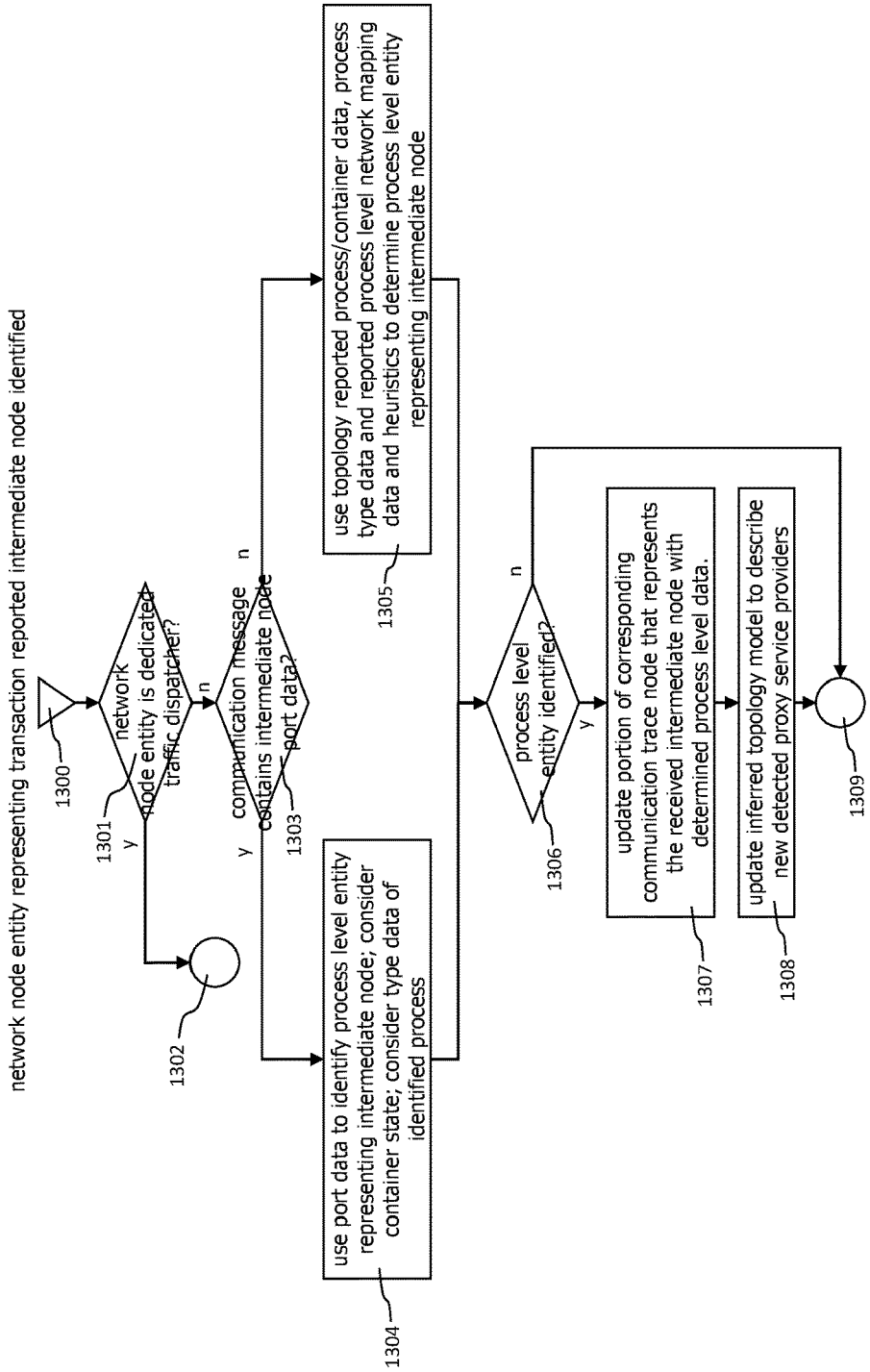
FIG 13: Determine Process Level Topology Entity for Identified Intermediate Network Node Entity

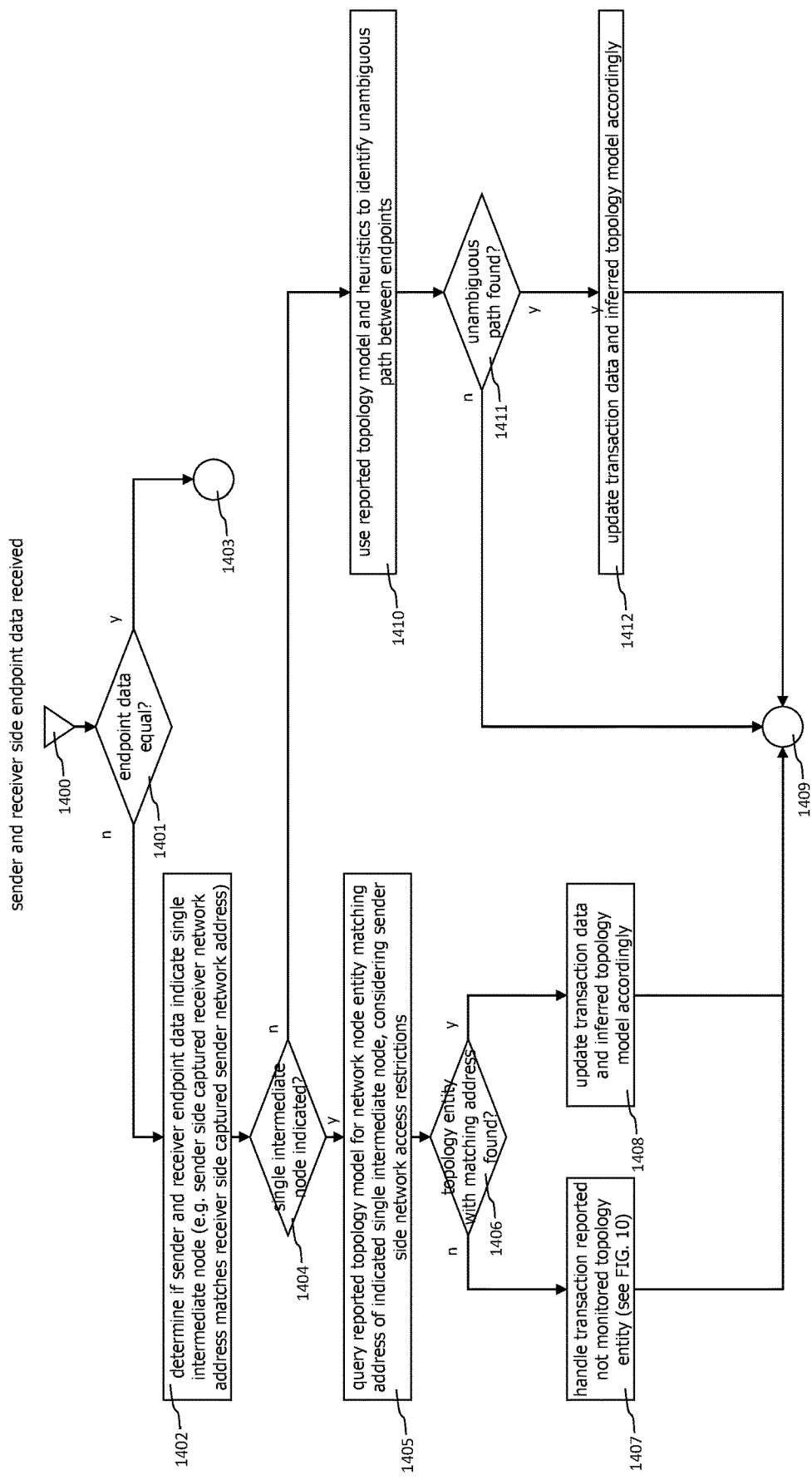

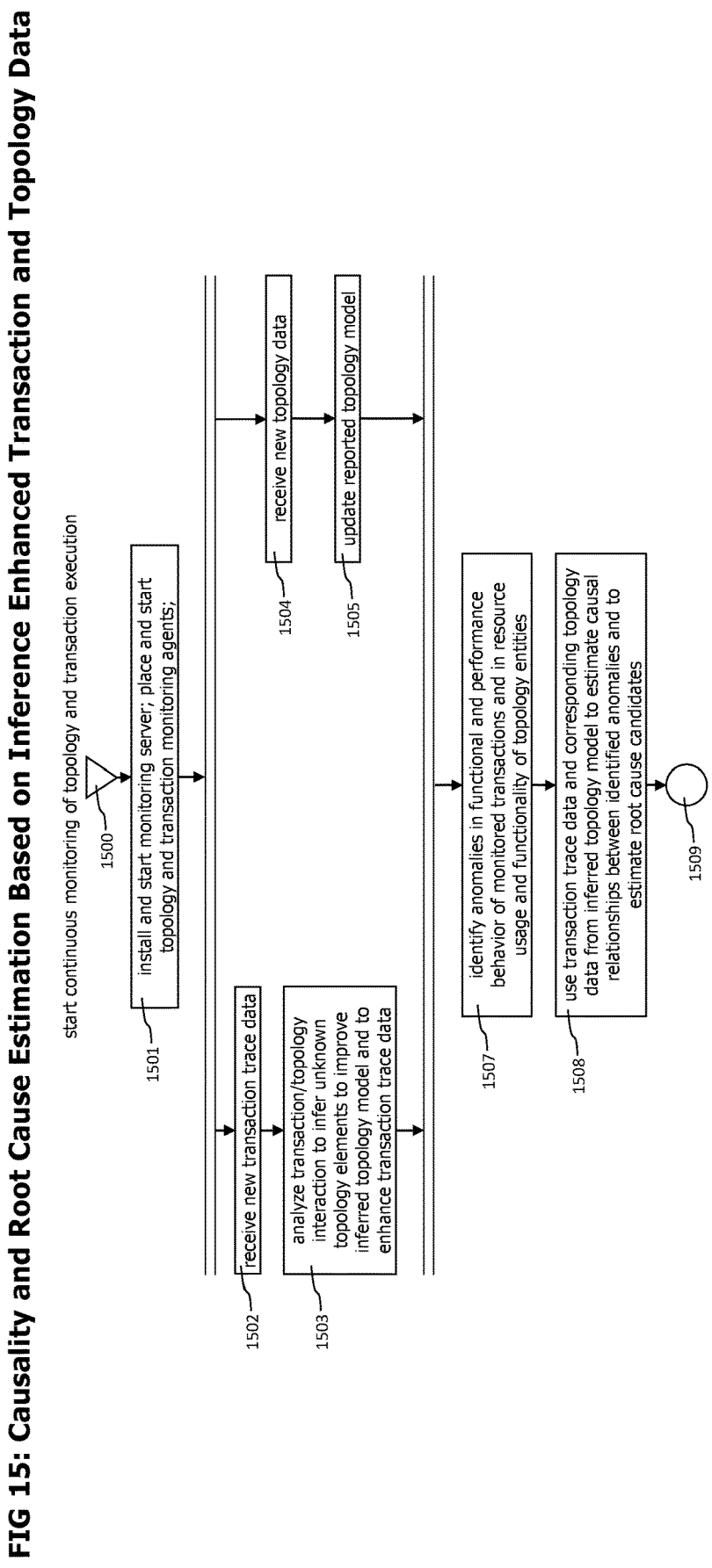
FIG 15: Causality and Root Cause Estimation Based on Inference Enhanced Transaction and Topology Data

METHOD AND SYSTEM FOR REAL-TIME CORRELATION OF DISPARATE SOURCES OF TOPOLOGICAL INFORMATION TO CREATE A UNIFIED TOPOLOGICAL MODEL OF A DISTRIBUTED INFORMATION SYSTEM

CROSS-REFERENCE TO RELATED APPLICATIONS

This application claims the benefit of U.S. Provisional Application No. 62/634,393, filed on Feb. 23, 2018. The entire disclosure of the above application is incorporated herein by reference.

FIELD

The invention generally relates to the monitoring of transaction execution environments in combination with the monitoring of the executions of transactions by these environments and specifically to the combined analysis of environment and transaction monitoring data to improve the knowledge about the transaction execution environment and to enrich the transaction monitoring data with context data extracted from execution environment data.

BACKGROUND

Modern application monitoring systems employ a holistic monitoring approach, which combines monitoring the structure of application infrastructure, monitoring the resource usage of different elements of the application infrastructure and monitoring of transaction executions on the application infrastructure. The combined monitoring data is used to create a topological model of the application infrastructure and to map resource utilization data and transaction execution monitoring data to the entities of this topological model.

Those modern monitoring systems typically use agents that are deployed to components of monitored environments like host computers/operating systems, processes and virtualization/cloud management entities. Those agents provide the topological, infrastructure monitoring and transaction monitoring data which is used by the monitoring system to create a holistic model of the monitored environment which is the basis for higher-level monitoring tasks like anomaly detection, estimation of causal relationships between anomalies and the identification of root cause anomalies.

To get a most realistic model of the monitored environment, it is desired to deploy an agent to all its components, but technological or organizational impediments may prevent this. As an example, some components of the monitored environment may consist of dedicated hardware appliances that do not provide interfaces for internal, agent-based or external monitoring. Some components of the environment may not be controlled by the owner/operator of the monitoring system, therefore installing agents to those components may be possible from a technological point of view but impossible due to organizational obstacles. Finally, the operator of the monitoring system may simply have forgotten to deploy agents to some components.

Not monitored components of the monitored environment may lead to an incomplete model of the monitored environment which may, in turn, lead to incorrect or misleading results of the higher-level monitoring tasks like causality and root cause estimation.

Transaction monitoring data may contain data describing communication activities between two endpoints like e.g. a client and a server process. It may, in addition to data describing the topological location of the endpoints and measurement data describing the performance of the monitored communication, also contain data describing the path of the communication, e.g. in form of data identifying intermediate components between the endpoints. In addition, monitoring data provided by virtualization monitoring agents may contain data describing running virtualized computer systems, regardless of an operating system agent running on the virtualized computer system.

This additional data provided by transaction and virtualization monitoring agents represents additional data describing the topology of monitored environments that may reveal the existence of not yet monitored or unmonitorable (e.g. due to a lack of agent interfaces) components of the monitored environment. This additional data could be used to enrich both the topological model of the monitored environment and the recorded transaction trace data. The benefits of such enriched topology and transaction data include more accurate and precise results of higher-level monitoring tasks like causality and root cause estimation.

Consequently, a method and system are required in the art for a combined analysis of transaction monitoring and topology model data to infer additional topology model and transaction execution data to improve both the topology model and the transaction monitoring data.

This section provides background information related to the present disclosure which is not necessarily prior art.

SUMMARY

This section provides a general summary of the disclosure, and is not a comprehensive disclosure of its full scope or all of its features.

The disclosed technology is directed to the combined and interlaced analysis of topology and transaction monitoring data to infer the existence of not monitored components that are used by monitored transactions and to enrich both the topological model of a monitored environment and transaction trace data describing transaction executions performed by the monitored environment with data of the inferred, not monitored components. The improved topology model and transaction data may be used as the basis for an enhanced detection of abnormal performance or error behavior and for an improved localization of those detected anomalies in the topology model, which in turn leads to a more accurate and precise causality and root cause estimation for multiple detected and localized anomalies.

Various agents are deployed to the components of a monitored environment, those agents may be of different types according to the type of component they are deployed to and according to the type of monitoring data they provide. Example agent types are cloud and virtualization agents for the monitoring of virtualization and cloud based environments that e.g. provide topology and resource usage data of virtualization and cloud related components, like hypervisor components hosting multiple virtualized computer systems, individual virtualized computer systems or cloud infrastructure components like load balancers or cloud endpoint services like relational database or file storage services, operating system agents for the monitoring of operating systems running on virtualized or real computer systems that e.g. provide topology and resource usage data of monitored operating systems, of processes running on those operating systems, data describing communication activities of monitored processes and of container based virtualization and process isolation components executed on the monitored operating systems, and process and transaction monitoring agents deployed to individual processes running in the monitored environment, that provide topology, resource usage and transaction tracing data from individual processes.

The agents send gathered topology, resource usage, and transaction trace data to a monitoring server or an interconnected cluster of monitoring servers.

The monitoring server uses the received topology data to incrementally build a multidimensional topology model of the monitored environment that integrates infrastructure, virtualization and transaction execution and service-related aspects of the monitored environment.

Received transaction trace data is used to incrementally create end-to-end transaction monitoring data describing individual transaction executions. Portions of the created end-to-end transaction monitoring data corresponding to services provided by individual processes are correlated with topology entities representing those transactions to also integrate transaction monitoring data with the topology model of the monitored environment.

The monitoring server may, in addition, perform a combined analysis of received transaction monitoring and topology monitoring data to infer the existence of components of the monitored environment that are not directly reported by deployed agents, e.g. because the nature of those components does not allow to deploy an agent to them.

Both transaction monitoring data and topology model may be enriched with the inferred components.

Variant embodiments may maintain a topology model based only on topology monitoring data reported by agents and a separate topology model that in addition contains inferred components to avoid that already inferred components may be used as the basis for the inference of the existence of further not reported components. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1a provides a block diagram of a monitoring system monitoring an application execution environment that is partly implemented using cloud computing components.

FIG. 1b shows a monitored application execution environment containing multiple proxy entities that transfer transaction communication between different application servers.

FIG. 1c shows a monitored application execution environment with applications involved in the execution of monitored transactions that run in container environments.

FIG. 2a-c provide flow charts that conceptually describe the agent side capturing and sending of transaction execution environment or topology monitoring data.

FIG. 3a-c show flow charts that describe the agent side capturing and sending of transaction execution monitoring data.

FIG. 4a-i show data records that may be used to transfer transaction and topology monitoring data.

FIG. 5a-f depict data records that may be used for the representation of transition execution and topology data on the monitoring server.

FIG. 6a-b provide flow charts that conceptually describe the processing of received topology monitoring data by the monitoring server.

FIG. 7a-b show flow charts describing the processing of received transaction monitoring data by the monitoring server.

FIG. 8 provides a flowchart showing an overview of the transaction/topology data inference process to improve both transaction and topology data.

FIG. 9 shows a flowchart describing the enrichment of transaction monitoring data using topology monitoring data of the topology entities that executed the transaction.

FIG. 10 shows a flowchart describing the processing of a transaction processing entity like a computer host system reported by transaction monitoring data that is not available in the topology model.

FIG. 11 provides a flowchart showing the processing of sender side endpoint data of a reported transaction communication to enrich both the topology model and the transaction monitoring data.

FIG. 12 shows a flowchart describing the processing of receiver side endpoint data of a transaction communication to identify intermediate traffic management nodes like proxies between sender and receiver and to enrich both transaction monitoring and topology data accordingly.

FIG. 13 shows a flowchart that describes the identification of process level data of previously identified intermediate traffic management nodes.

FIG. 14 shows a flowchart describing the process of analyzing server and receivers side endpoint data of a monitored transaction communication to identify further intermediate traffic management nodes.

FIG. 15 shows a flowchart that illustrates the usage of enriched transaction monitoring and topology data to identify anomalies transaction execution behavior and to further identify causal relationships and the root cause for such identified anomalies.

Corresponding reference numerals indicate corresponding parts throughout the several views of the drawings.

DETAILED DESCRIPTION

Example embodiments will now be described more fully with reference to the accompanying drawings.

Embodiments of the present technology are directed to the combined and interleaved analysis of topology and transaction monitoring data to infer the existence of not monitored components of a monitored environment and to either enrich topology and transaction monitoring data with data describing the inferred components or to notify the user of a monitoring system that the existence of unmonitored components of the monitored environment was detected.

Topology and transaction monitoring data are typically provided by agents deployed to the components of a monitored environment. Different types of agents may be deployed to different types of monitored component. Those different types of agents may provide monitoring data describing different aspects of the component they are deployed to.

As an example, cloud and virtualization environment agents may be configured to monitor virtualization components that provide virtualized computer systems, like hypervisor components, or they may monitor cloud utilization data like number and type of cloud computing systems currently used by a monitored environment, or they may monitor cloud-inherent infrastructure components, like load balancing or proxy services provided by the cloud environment to control the flow of requests and data. Further, cloud and virtualization environment agents may provide topological monitoring data e.g. describing the relationships between virtualization provider components and virtualized computer systems (e.g. which virtualized computer system is provided by which hypervisor instance), or they may provide monitoring data describing the data flow created by data flow components of a monitored cloud environment (e.g. data paths established by load balancing components from the load balancing component to various receivers of the balanced load). Cloud and virtualization agents may further monitor and report network topology related aspects of the monitored environment, like virtual private cloud configuration data which defines network accessibility and visibility rules of cloud components.

Operating system agents (or OS agents) may be deployed to operating systems running on concrete or (cloud) virtualized computer systems and may provide resource availability and usage data of the monitored operating system. OS agents may further provide correlation data identifying the operating system instance they are deployed to which may also be used to identify the corresponding virtualized computer system running the operating system that is monitored and reported by a virtualization and cloud agent. The OS agent may further monitor resource utilization and communication activities of processes running on the monitored operating system and it may also provide topology data describing the monitored operating systems and the processes running on it. OS agents may in addition monitor container-based virtualization and process isolation performed by container management processes executed on monitored operating systems. Those container management processes may create isolated execution environments for processes. Isolated execution environments may e.g. simulate a separate operating system environment for a process. This simulated operating system environments may, in addition to a separated process execution environment, provide a configured view on the network environment of the hosting operating system, including a mapping of component internal to component external network identifiers, a restricted view on network components from inside the container or even separated multi-container networks, like overlay-networks provided by docker container virtualization environments.

Process or transaction agents may be deployed to processes running on operating systems of the monitored environment and may provide fine-grained resource utilization, communication and transaction execution monitoring data. The process or transaction agents may create and report topology data describing services (e.g. HTTP services or remote method invocation services) provided by the monitored processes and they may provide transaction trace and monitoring data that describe transaction executions performed by the monitored processes. Process or transaction agents run inside the process context of the monitored process and therefore have the same level of access to process internal data as other (application) code that is executed by the process. Therefore, process or transaction agents may also be referred to as in-process agents.

The provided transaction trace and monitoring data may, in addition, contain data identifying the services used by the monitored transactions.

The topology data provided by the different agents is received by an individual monitoring server or a monitoring server cluster and may be used to incrementally create a topological model of the monitored environment. Resource usage and transaction trace data are also received by the monitoring server or monitoring server cluster. The received transaction trace data is processed to create end-to-end transaction trace data. Resource utilization and transaction execution performance measurement data extracted from received transaction trace data are analyzed to identify abnormal resource usage or transaction execution performance. The identified abnormal conditions are analyzed in view of the known topology model to identify causal dependencies between different abnormal conditions and to identify for multiple, causally related abnormal conditions, those abnormal conditions out of the causally related abnormal conditions with the highest probability of being the root cause of all identified causally related abnormal conditions.

The individual or clustered monitoring servers may, before performing anomaly detection and root cause calculation, perform a combined analysis of received topology data and transaction trace data to identify evidence of components existing in the monitored environment for which no direct topology data is available, e.g. because no agent is deployed to monitor those components for various reasons. The evidence for those existing but not monitored components may be used to create a version of the topology model that also describes those not directly monitored components. Further, this evidence may be used to enrich end-to-end transaction trace data containing evidence that those not directly monitored components are used with additional data describing the usage of those not directly monitored components by the transaction. In addition a user or administrator of the monitoring system may be notified about the existence of those not directly monitored components together with a suggestion to add agents to those not directly monitored components.

Referring now to FIG. 1a, which provides a block diagram of a monitoring system consisting of a monitoring server 101 that receives topology data 121 and transaction trace and monitoring data 120 from various types of agents deployed to components of a monitored environment.

The exemplary monitored environment depicted in FIG. 1a consists of a not virtualized host computer system 130, running a process that executes application 1 131. A transaction agent 150a is deployed to application 1 and monitors transactions (e.g. T1 140 and T2 141) executed by application 1. An OS agent 151a is deployed to the operating system executed on host 1 130 and monitors overall resource usage of the operating system executed on host 1. The OS agent 151a also monitors resource usage and communication activity of processes running on the operating system, like the process running application 1 131. OS agent 151a provides topology monitoring data describing and identifying the computing system host 1, processes executing on host 1, like the process 131 running application 1 131, and topology data describing communication activities of the processes running on host 1.

Further, the monitored environment contains components running in a cloud/virtualization environment 132, like a load balancing service 133 and virtualized, cloud computing systems host 2 136 and host 3 134, running processes application 2 137 and application 3 135. A cloud and virtualization monitoring agent 152 is installed in the cloud environment 132 which uses monitoring interfaces of the cloud management system. Those monitoring interfaces of the cloud management system are used to provide and control the cloud environment 132 to request and report data describing cloud components and their relationships, including communication and usage relationships. The cloud and virtualization monitoring agent 152 may be implemented as process running on a host computing system (virtualized or not virtualized), the host computing system may run inside or outside the monitored cloud/virtualization environment, as long as the cloud and virtualization agent is able to access the monitoring interfaces of the cloud management systems. In some variant embodiments, the cloud and virtualization monitoring agent may be implemented as functionality of a part of the monitoring system components, like the monitoring server 101.

Further, the cloud and virtualization monitoring agent 152 may fetch and report network configuration data, like configuration data defining virtual private cloud environments that define accessibility and visibility of individual components of the cloud environment to form networks of isolated subsets of cloud components with a defined interface, e.g. in form of a load balancer configured to receive requests from outside the virtual private cloud and routing them to components of the virtual private cloud.

Example interfaces that may be used by the cloud and virtualization agent are the Amazon CloudWatch® interface for AWS cloud environments as e.g. provided by Amazon.com, Inc. or Azure Monitor for Azure cloud environments as e.g. provided by the Microsoft Corporation.

An OS agent 151*b* may be deployed to host 3 134, which monitors 153 the process running application 3 135, and a transaction agent 150*b* may be deployed to the process of application 3 135 which monitors transactions executed by application 3.

Host 4 138, which runs application 4 139, also belongs to the monitored environment. An OS agent 151*c* is deployed to host 4, which monitors the process that runs application 4. In this case, no transaction agent 150 is deployed to the application process for one of various reasons, including the lack of availability of an agent for the application architecture used for application 4, or a monitoring configuration that excludes the deployment of a transaction agent to application 4. OS agent 151*c* provides topology monitoring data describing and identifying the computing system host 4, processes executing on host 4, like the process 139 running application 4 139, and topology data describing communication activities of the processes running on host 4.

The cloud and virtualization agent 152 monitors 154 the cloud and virtualization environment 132 and provides topology data describing the existence of the virtualized cloud hosts host 2 136 and host 3 134 and the load balancing service 133. Further, the cloud and virtualization agent 152 may query configuration data of host 2 136 and host 3 134 describing the resources of the virtual computing system in terms of CPU, main memory, and persistent memory, and it may query configuration and capacity data of the load balancing service 133 in terms of maximal rate of processed requests and input/output mapping data describing one or more network endpoints (i.e. network address and port for TCP/IP based networks) at which the load balancing service expects incoming requests and corresponding mapped network endpoints to which the load balancing service distributes received requests. The topology data created by the cloud and virtualization data may further describe that the load balancing service forwards received requests to host 2 136 and host 3 134.

An OS agent 151*b* is deployed to the virtualized cloud computing system host 134, which monitors the operating system executed on host 134. The OS agent 151*b* also monitors 153 processes executed on the operating system, like the process running application 3 135. The topology data provided by the OS agent 151*b* includes data describing and identifying the monitored operating system running on host 3 134 and data identifying the host computing system host 3 134, where the identifying data for the host computing system provided by the OS agent contains data that may be used to identify the corresponding virtual computing system reported by the cloud and virtualization agent 152. The OS agent further provides topology data describing the processes executed by the operating system of host 3, like the process running application 3 135, and data describing the communication activities of those processes.

Transactions T1 140 and T2 142 are currently executed by the monitored environment, both transactions enter the system via application 1 running on host 1. Both transactions are initially processed by application 1 and then forwarded to the load balancing service 133 of the cloud portion of the monitored environment. The load balancing service 133 decides, based on its configuration data, that transaction T1 140 is forwarded to application 2 137 running on host 2 136 and that transaction T2 142 is forwarded to application 3 135 running on host 3 134. Processing of T1 140 is finished on application 2. Processing of transaction T2 continues on application 3 135, which is executed on host 3 134, and is then forwarded to application 4 on host 138, where processing of transaction T2 is finished.

The transaction agents 150*a* and 150*b* deployed to processes 131 running application 1 131 and application 3 135 monitor the execution of transactions, like transactions T1 140 and T2 141 by the processes they are deployed to and provide transaction trace data fragments describing portions of the execution of transactions together with correlation data that may be used to identify and correlate transaction trace data fragments from different agents that describe different portions of the same transaction. Portions of transaction data fragments provided by the transaction agents that describe interprocess communication (e.g. for transaction T1 140 the portion of T1 executed on application 1 that caused the execution of a portion of T1 on application 2 on host 2), contain data describing both communication endpoints as seen from the sender or receiver process.

As an example, the portion of the transaction trace fragment describing communication between application 1 and application 2 as provided by transaction agent 150*a* contains data describing the communication endpoint identifying application 1 131 on host 1 130 as sender endpoint, and the communication endpoint of the load balancing service 133 to which the communication message was sent as receiver endpoint, as the load balancing service acts as receiver of communication messages or requests for sender applications, even if it only forwards the communication message or request to a real receiver, like application 2 137 on host 2 136. As another example, application 3 receives a request to continue the execution of transaction T2 sent from application 1 via the load balancing service 133. Even if the request was originally sent by application 1, for the receiver application 3 the visible network endpoint from which the request was received is the load balancing service.

Transaction trace data created by transaction agents 150*a*, 150*b* and 150*c* contains, next to data describing the execution of transactions, topology localization data that identifies the component that executed a portion of a transaction (e.g. a process) with the corresponding topology entity describing this component. The topology localization data allows localizing the position of transaction executions within the topology model.

The transaction agents send the topology localized transaction trace data 120 to a monitoring server 101, which forwards it to a transaction trace data processor 102. The transaction trace data processor correlates transaction trace data corresponding to the same monitored transaction to incrementally create end-to-end trance data 123 describing the whole monitored transaction.

Topology data 121 as sent by OS agents and cloud and virtualization agents, is processed by a topology data processor component 104 of the monitoring server to create a topology model 105 of the monitored environment as reported by the various agents. The topology data processor may in addition process transaction trace data 120 and end-to-end transaction data to extract data describing services provided by processes involved in the execution of those transactions, to extract service call relationships out of the processed transaction data and to enrich the topology model 105 with this service data (not shown).

Finished end-to-end transaction trace records 123 are forwarded by the transaction trace processor 102 to a transaction/topology inference processor 109. The transaction/topology inference processor analyzes the received transaction record and queries known transaction related topology elements 112 from the reported topology model 105. Those queried topology elements may include topology elements describing processes that executed portions of the transactions, host computing systems on which those processes were executed and communication activities of those processes. The inference processor 109 may, for transactions with outgoing calls for which no receiver side tracing data is available, like transaction T1 for which no trace data describing the execution on application 2 is available, due to missing agents on host 2 136 and application 2 137, use data describing the outgoing request to identify the topology element corresponding to the receiver component. In case of T1, the data describing the outgoing request identifies an incoming endpoint of the load balancing service 133 as receiving endpoint. The inference processor may use data describing the load balancing service as a component that does not process requests but only forwards requests, to determine that load balancing service 133 is not the receiver of the request but only an intermediate node.

The inference processor may further use input/output mapping configuration data of the load balancing service 133 captured by the cloud and virtualization agent 152 to determine the network endpoint behind the load balancer 133 to which the incoming request from the execution of T1 140 on application 1 131 was forwarded. A load balancing service typically provides a set of input network endpoints and a set of output network endpoints. Incoming requests on input network endpoints are forwarded to output network endpoints according to the mapping configuration of the load balancing service.

The analysis of the mapping configuration data of the load balancing service 133 in combination with the portion of the transaction trace data of transaction T1 140 describing the outgoing request of application 1 131 reveals that the final receiver of the request is a process (i.e. application 2 137) on host 2 136. The topology data provided by the cloud and virtualization agent 152 already showed the existence of host 2, and missing corresponding topology data form an OS agent showed that no OS agent and no transaction agents are installed on host 2.

Only the inference of topology and transaction data showed that the not monitored host 2 is involved in the execution of transactions that are already, at least partial, monitored. A notification about a not fully monitored entity 114 may be issued to the user of the monitoring system as consequence of this finding.

The inference processing of transaction T2 reveals a request from application 3 135 to application 4 on host 4. OS agent 151*c* is deployed to application 4, which provides data describing existence and type of application 4 on host 4 for the topology model. However, no transaction agent is deployed to the process running application 4, therefore no trace data describing the processing of T2 on application 4 is available. There are various reasons why no transaction agent is deployed to a process, reaching from the deliberate or accidental configuration that excludes a specific process from being monitored by a transaction agent to a process implementation and architecture for which no appropriate transaction agent is available. Software components providing database services typically use software architectures that do not support the injection of a transaction agent.

The inference processor 109 may analyze the request sent from application 3 to application 4 to determine the network endpoint to which the request was sent. The OS agent 151*c* deployed to host 4 138 monitors processes that are executed on host 4 and their communication activities, including network endpoints which are used by those processes to receive requests. The inference processor 109 may use the topology data provided by OS agent 151*c* to identify application 4 as the recipient of the request sent by application 3 to process transaction T2 140. The inference processor may further use topology data describing the process running application 4 to determine the type of this process. In case the process type of application 4 is one for which a transaction agent is available, it may issue a notification of an entity that is not fully monitored.

Otherwise, it may use known topology and transaction facts to improve both transaction trace and topology data. As an example, the topology of application 4 may show that application 4 runs a database system of a specific vendor, type, and version, but it may not contain data identifying the network endpoints at which application 4 provides database services. The transaction trace data may show that application 3 sent a request for a database service to a specific network endpoint provided by application 4.

The inference processor may improve the transaction trace data by adding data describing the concrete database system to which the database service request was sent to the portion of the transaction trace data describing the database service request. It may further improve the topology model by adding data to the model that describes that application 4 provides a database service at the network endpoint to which application 3 sent its database service request.

Improvements to the topology model identified by the inference processor 109 may be stored in a separate version of the topology model 106 that contains enrichments of the topology model identified by the inference processor. The reason for a separate, inference improved topology model is to avoid that the inference processor uses already inferred data for further inference processing as this improves the possibility of incorrect inference results.

The enhanced end-to-end transaction trace data may be stored 111 in a transaction repository 103 for subsequent processing.

An anomaly detection module 107 may use the enhanced end-to-end transaction traces 123 stored in the transaction repository 103 and the enriched topology model 106 to identify abnormal operating conditions of transaction executions and topology entities and to localize those abnormal operating conditions in the topology model to create topology localized anomaly data 124. The created anomaly data may be used by a causality analysis module, together with topology data and other transaction trace data to calculate possible causal relationships between identified abnormal operating conditions to create networks of causally related anomalies 122.

Referring now to FIG. 1b which shows a monitored environment containing various proxy components. A proxy component represents an intermediate communication component that terminates network connections on lower, transport-oriented network levels while simulating a continuous logical network connection on a higher, application level. A typical task of proxy component is to cache response data to reduce the load on components behind the proxy. In case a request is received by the proxy, it first checks if it received an equivalent request before and has the corresponding response in its cache. In case the response is cached, the cached version is returned to the requestor. Only if the response is not in the cache, the request is forwarded to the real receiver. Proxy components dedicated to the processing of HTTP based communication may adapt received requests before forwarding them with data indicating that the request was forwarded by a proxy component. Proxy components may use the X-Forwarded-For feature to store data identifying the network node that sent the request that was forwarded by the proxy (this may be another proxy component in case of a sequence of proxy components sequentially processing received requests. In this case, all proxies may use the X-Forwarded-For to store data describing the network host from which they received a request, and the sequence of data stored in the X-Forwarded-For data store reflects the sequence of the proxies forwarding the request). Alternatively, proxies may use the "Forwarded HTTP Extension" feature to modify processed requests, by adding data describing the processing proxy and data describing the network node (i.e. IP address or domain name) or network endpoint (i.e. IP address or domain name and port) and an identifier for the protocol used to transfer the request.

The functionality of a proxy component may be implemented in form of specialized hardware appliances, or it may be implemented as a software component.

The exemplary monitored environment that is shown in FIG. 2 consists of an external host 157, running outside of a data center or other environment controlled by the operator of the monitored environment, on which a web browser 158 is running. A browser agent 156 is injected into the web browser. The content displayed by the web browser may be provided by an application running in the monitored environment and the application may be configured to insert a browser agent 156 into provided content. Browser agents are inserted into the content they are monitoring. Therefore, they have the same level of access to browser and content internal data as process or transaction agents have to process internal data.

The browser agent 156 monitors and traces 155 user interactions performed on the browser and sends monitoring and tracing data in form of topology localized trace data 120 to the monitoring server. For browser side transaction monitoring data that describes portions of transaction exactions that are performed outside the monitored environment, the topology localization may describe a localization aspect that is independent of the internal topology of the monitored environment. Topology localization aspects for browser-based portions of transaction executions may include data describing the geolocation of the web browser which was used to perform the transaction execution.

An external proxy component 159 receives requests sent by the browser 158 on a network connection between the browser 158 and the external proxy component, adapts 168a the received request (e.g. by using either the X-Forwarded- For or the "Forwarded HTTP Extension" feature as described above) to notify receivers of the request that the request was intermediately processed by the proxy and forwards the request to application 4 161 running on host 4 160 using a separate network connection between the external proxy component 159 and application 4 161.

A dedicated proxy appliance 162 (i.e. a dedicated hardware component solely providing proxy functionality) receives requests sent from application 4 161 on host 4 160, adapts 168b those requests and sends them on a separate network connection to a proxy application 164 running on proxy host 163. The proxy application 164 also adapts the received request and forwards it to application 5 166 running on host 5 165.

OS agents 151c, 151d, and 151e are deployed to host 4 160, proxy host 163 and host 5 165. Those OS agents monitor processes running on the hosts they are deployed to and provide topology data 121 describing those hosts and the processes running on them. OS agent 151d running on proxy host 163 monitors the proxy application process 164, identifies the type of the process as proxy application e.g. by analyzing the command line used to start the process or by analyzing the executable used by the process. Further, the OS agent may analyze configuration data of the identified proxy application process to e.g. determine mapped input and output network endpoints of the proxy application process. This determined mapping data may be sent to the monitoring server 101 as part of topology data 121. Common proxy applications are based on application architectures and/or programming languages that do not support the injection of in-process agents, therefore no transaction agents may be deployed to proxy application processes 164.

Transaction agents 150c and 150e are deployed to application 4 161 and application 5 166. Those transaction agents monitor the execution of transactions by those applications and send the corresponding topology localized trace data 120 to the monitoring server.

Both transaction agent 150c and 150e and browser agent 156 may add transaction tagging and correlation data to outgoing requests and may read transaction tagging data and correlation data from incoming requests. The read transaction tagging and correlation data may be sent to the monitoring server 101 as part of the topology localized transaction trace data 120 and may be used to identify and combine transaction trace data describing portions of the same transaction that were provided by different agents.

Transaction T3 167 is currently executed by browser 158 and the monitored environment. The execution of transaction T3 starts with a user interaction performed on the browser 158, which is monitored by the browser agent. The browser agent reports the portion of T3 executed on the browser 158 in form of topology localized trace data to the monitoring server 101.

The transaction trace data 120 generated by the browser agent 156 may also contain data describing requests sent by the browser to process the transaction T3. This may include data describing the client and server-side network endpoints (i.e. network address and port) of the network connection used to send those requests.

The request sent by the browser 158 to execute transaction T3 is received by the external proxy component 159, adapted by the proxy component by adding data describing the network node from which the forwarded request was sent (i.e. by using the X-Forwarded-For feature and adding the data identifying the external host 157 as sender of the forwarded request) or in addition also adding data identifying the external proxy and the protocol used to transfer the request (i.e. by using the "Forwarded HTTP Extension" feature).

The external proxy component forwards the request to application 4 running on host 4. The transaction agent 150c injected into application 4 recognizes the receipt of the request and creates transaction trace data 120 describing the receipt of the request which is sent to a monitoring server. The transaction agent 150c captures data describing the client and server-side network endpoints used to transfer the received request (i.e. the network endpoint used by the external proxy as client-side endpoint to forward the request and the network endpoint used by application 4 to receive the request) and data describing the request adaptations performed by the external proxy component (i.e. by checking if the request contains X-Forwarded-For or "Forwarded HTTP Extension" data and capturing this data if it is available). Both network endpoint data and proxy request adaptation data are sent to the monitoring server as part of topology localized trace data 120.

The monitoring server may correlate portions of T3 167 executed on the browser with portions of T3 executed on application 4, and may later perform topology inference processing with the data describing the communication between browser and application 4 to execute transaction T3. This inference may reveal that the communication between browser 158 and application 4 is not direct, but routed via at least one intermediate component. This may be performed by comparing the network endpoint data captured on the browser side with the network endpoint data captured by the transaction agent 150c deployed to application 4 and determining that endpoint data captured on the server and client-side of the communication do not match. In addition, inference processing may check if data is available on request message data captured on the server-side of the communication that indicates that the intermediate components contain a proxy component (i.e. X-Forwarded-For or "Forwarded HTTP Extension" data). The inference process may then update the inference findings enriched topology model 106 with data of a proxy component 159 between the web browser 158 and application 4. A causality analysis module may use this enriched topology model to e.g. identify the external proxy component as a potential root cause of observed anomalies like a drop of the transaction load seen on application 4 combined with an increase of failing requests from browsers communicating with application 4 via the external proxy component 159.

Transaction T3 is partially processed by application 4 on host 4 and then continued with a request sent to application 5 running on host 5. Request from application 4 to application 5 to fulfill T3 are routed via the internal dedicated proxy appliance 162 and the proxy application 164 running on proxy host 163.

The transaction agent 150c injected into application 4 161 recognizes the request sent from application 4 to process T3 and creates transaction trace data describing this request from the client-side, including client and server-side communication endpoint data as seen from application 4 161. The request is sent to the dedicated proxy appliance 162 (which is seen as server-side communication endpoint from application 4), which adapts 168b the received request (i.e. by adding X-Forwarded-For/Forwarded HTTP Extension data to the request) and forwards the request on a separate network connection to the proxy application 164, which also adapts 168c the received request and forwards it to application 5 running on host 5 using again another network connection. The transaction agent 150e injected into application 5 recognizes the receipt of the request sent from application 4 to execute T3 and captures transaction trace data describing the receipt of the event. This included capturing data describing network endpoint data of sender and receiver side of the request as seen from application 5 (which sees proxy application 164 as sender of the request) and capturing data describing the received request from the server-side which may include data describing adaptations of the request performed by intermediate proxy components (X-Forwarded-For/Forwarded HTTP Extension data). The captured transaction trace data 120 is sent to the monitoring server 101. The monitoring server correlates transaction trace data portions describing transaction T3 sent from transaction agents 150c and 150e and afterwards performs topology inference processing with the portion of the end-to-end transaction trace data describing the communication between application 4 161 and application 5 166.

Topology inference processing may again first analyze the communication endpoint data provided by the transaction agent 150c deployed to application 4 161 and by transaction agent 150e deployed to application 5 166. This analysis reveals that the endpoints reported by the different agents do not match which indicates that the communication between application 4 and application 5 is not performed directly but routed via at least one intermediate node.

Afterwards, inference processing may analyze the request message received by application 5 (which may have been captured by transaction agent 150e and sent to the monitoring server 101 as part of topology localized transaction data 120). The request message received by application 5 contains the adaptations performed by dedicated proxy appliance 162 and proxy application 164, which may be used by the inference process to determine that the request sent from application 4 to application 5 was processed by at least two proxy components.

For further considerations, it is assumed that request adaptations performed by proxy components (i.e. dedicated proxy appliances or proxy applications) use the X-Forwarded-For feature, as X-Forwarded-For is widely used in the industry and because X-Forwarded-For provides a subset of the data that is provided by the "Forwarded HTTP Extension" feature. As a consequence, all analyses and processing described here assuming the usage of the X-Forwarded-For also work for the "Forwarded HTTP Extension" feature.

The analyzed request data may contain a X-Forwarded-For header field with a value starting with an identifier of the network node that originally sent the request (i.e. network address of host 4 160 running application 4161) which was added by the dedicated proxy appliance 162 to the request, followed by an identifier of the first proxy component forwarding the request (i.e. network address of dedicated proxy appliance 162) which was added by the proxy application 164 running on proxy host 163. There is no data contained in the X-Forwarded-For header identifying proxy application 164 as the second forwarder of the request as X-Forwarded-For only contains data identifying the entity from which a forwarded request was received. Therefore, the last element of a proxy chain is not represented in X-Forwarded-For data. To identify the last element in the proxy chain, inference processing may use the network endpoint data of the entity that sent the request to application 5, as provided by transaction agent 150e.

Network endpoint data typically contains a data identifying network node (i.e. a network address) and data identifying a component on the component on the network node (i.e. a port number identifying a socket on the network node)

that is associated with a component (e.g. a process) on the network node that sends and receives data by the identified network endpoint.

The network endpoint data of the request sender as seen by application 5 identifies proxy host 163 as network node from which the request was sent. The network endpoint data further contains a port number that identifies the network socket on proxy host 164 that was used to send the request. The operating system running on proxy host 163 manages the usage of sockets by processes (like the process running the proxy application 164) and maintains mapping data between process identifiers (i.e. PIDs) and socked identifiers (i.e. port numbers assigned to those sockets) of sockets used by the process. The OS agent 151*d* deployed to the proxy host 163 may capture this mapping data and send it to the monitoring server as part of the topology data 121. The OS agent may further analyze command line and executable binary used to start the proxy application process 164 to determine that this process provides a proxy service and it may further fetch configuration data used by the proxy service, like data defining the mapping of input and output network endpoints of the proxy service. This data may also be sent to the monitoring server as part of the topology data.

The topology data processor 104 of the monitoring server 101 may process this data describing the proxy application process 164 to add an entity representing the proxy application to the reported topology model 105. It may further store the proxy service configuration data fetched by the OS agent in the entity representing the proxy application, and the topology data may further store the data describing the usage of ports/sockets by the proxy application in the corresponding topology entity.

The inference processing may use the reported topology data describing proxy application 164 together with the sender side network endpoint data of the request received by application 5 to identify proxy application 164 as the last element of the proxy chain between application 4 and application 5. Inference processing may update the end-to-end transaction data describing transaction T3 to describe that communication between application 4 and application 5 to execute T3 is routed via proxy application 164.

In addition, inference processing may add data to the inferred topology model 106 describing that the service provided by application 5 that was used to process transaction T3 is connected to proxy application 164. The inference processing may further analyze the request adaptations (i.e. X-Forwarded-For header) added by proxy application 163, which identify the network node from which the proxy application 163 received the request. Analysis of the request adaptations provides the network address of the dedicated proxy appliance 162. Inference processing may use the network address extracted from the request adaptation data to query the reported topology model for an entity with a matching network address.

As no agent is (or can be) deployed to dedicated proxy appliance 162, no topology data describing or indicating the existence of dedicated proxy appliance is available in the reported topology model. Inference processing may further compare the network address extracted from the request adaptations with the sender network address reported by the transaction agent 150*c* deployed to application 4 to verify the hypothesis that the sender from which proxy application 164 received the request is already the original sender application 4 161 on host 4 160.

As this is not the case, this hypothesis is rejected and inference processing continues by analyzing the request adaptation data, which may reveal an entry added by dedicated proxy appliance 162 indicating that dedicated proxy appliance 162 received the request from host 4 160 which executes application 4 161, the original sender of the request as reported by the end-to-end transaction trace data describing transaction T3 167. This supports the hypothesis of an unknown proxy component situated between application 4 and proxy application 164.

In addition, inference processing may compare the network address of the receiver network endpoint of the request as reported by transaction agent 150*c* deployed to application 4 with the network address from which proxy application 164 received the request. Those network addresses are identical which also supports the hypothesis of an unknown proxy component situated between application 4 and proxy application 164. As a consequence, inference processing may update the portion of the end-to-end transaction data of T3 describing the communication between application 4 and application 5 to indicate that this communication was routed via a proxy component with the address extracted from request adaptation data before it was routed via proxy application 164.

In addition, the inferred topology model 106 may be enriched with an entity describing dedicated proxy appliance 164, and with data describing the observed communication activity of dedicated proxy appliance 164 with application 4 and proxy application 164.

It is noteworthy that request adaptation by proxy services is optional, and some proxy services may be configured to not perform it. As a consequence, further proxy service components may exist between application 4 161 and dedicated proxy application 162, between dedicated proxy application 162 and proxy application 164 or between proxy application 164 and application 5 166. Inference processing may not be able to identify those hidden proxy services, but it may use reported topology data in combination with reported request adaptation data and network endpoint data to determine if such hidden proxy service components exist.

As an example, inference processing may reveal that the original sender of a request reported by request adaptation data is not identical with the original sender of the request reported by end-to-end transaction data. This indicates that at least one hidden proxy service component is located between the original sender of the request as reported by the end-to-end transaction trace data and the first proxy service component that performed request adaptation.

OS agents monitor communication activities of processes executed on operating systems on a TCP/IP level. This also includes communication activities that are not captured by transaction agents. Therefore, the absence of monitoring data indicating TCP/IP level communication between two processes or hosts that were reported as adjacent entries in a proxy chain by request adaptations may be used as an indication that one or more hidden proxy service components, that did not perform request adaptations, are located between the two reported proxy components.

Other contradictions between transaction agent provided transaction-based communication data, like reported client-side (i.e. sender of a request) and server-side (i.e. receiver of a request) sender and receiver network endpoint data and captured proxy request adaptation data (i.e. X-Forwarded-For header data), and OS agent provided network-based (i.e. TCP/IP connection data), may be used as indication of hidden proxy service components (i.e. proxy service components that do not perform request adaptations). As an example, request adaptation data may indicate two adjacent proxy applications in a proxy chain, both proxy applications may run on different host computer systems, monitored by OS agents. The OS agents monitor and report the network communication activities of processes running on both hosts, including the network communication of the proxy application processes. Missing direct network communication data between the proxy applications may be used as an indicator that communication is routed via at least one hidden proxy service component between the two OS agent monitored proxy applications, despite captured request adaptation (X-Forwarded-For) data indicates that both proxy applications communicate directly.

Coming now to FIG. 1c which depicts a variant of a monitored environment in which container-based virtualization and process isolation (as e.g. provided by the docker product) is used. Containers are software components executed by a host operating system and provide an isolated operating environment for processes running inside such containers. Containers simulate a separate operating system using resources of the host operating system like network interfaces, CPUs, main and secondary storage. A container configuration defines a container specific view and usage permissions of resources of the host operating system.

The network related portion of the container configuration may be used to define network addresses for containers (i.e. a container running on a host computer system with network address "a" may be assigned a network address "b" and the container management system assures that the container is reachable via address "b"), define port mappings between container internal and external ports (i.e. a port 80, used by a process running in a container may be mapped to an external port 8080 of the host operating system, and the container management system assures that communication from inside the container addressing port 80 is forwarded to port 8080 of the host operating system and vice versa), and to configure container specific overlay networks that define connectivity, visibility and accessibility amongst different container instances.

OS agents (i.e. OS agents 151*f* and 151*h*) deployed to hosts on which container management systems are running (i.e. host 6 181 and host 8 177) may also monitor running containers (i.e. container 1, 169, container 2 171, container 3 173 and container 4 178), running container manager processes (not shown) and running container manager coordination processes (to e.g. ease inter-container communication between containers running on different host computer systems).

OS agents may also report container related topology data identifying and describing running containers, where the OS agent may further fetch above described container configuration data and add it to the topology data which is sent to the monitoring server. OS agents may further fetch configuration data potentially affecting multiple containers, like configuration data defining container overlay networks and send this data to the monitoring server as part of topology data.

The topology data processor 104 of the monitoring server 101 receives this container related topology data and enriches the reported topology model with topology entities describing the reported containers, their configuration data and network mapping (network address, port) and network connectivity, visibility and accessibility data. The created topology model describes which containers are hosted by which host computer systems and how those containers are accessible from other topology elements.

The OS agents may further manipulate the configuration of starting containers in a way that transaction agents deployed to processes running in the containers have access to the monitoring server (either directly or via the OS agent running on the host), and in a way that transaction agents running in the container have access to identification data of the host computer system and the container, e.g. by creating a file containing this identification data on a position and with a name in the file system of the container, where position and name are known by transaction agents deployed to processes running in the container. Transaction agents running in container environments may use this identification data for the creation of topology localized transaction trace data to create data describing the location of monitored transaction executions in terms of a container instance in which the execution occurred and in terms of a host computer system running the container instance.

The scenario of FIG. 1c shows a monitoring environment containing the hosts host 6 181, host 7 175 and host 8 177, all those hosts being monitored by OS agents 151*f,* 151*g,* and 151*h.*

Host 6 181 runs a container management system which currently executes containers 1 169, container 2 171, and container 3 173. OS agent 151*f* monitors 153 the running containers and the processes running in those containers (i.e. application 6 170 in container 1 169, application 7 172 in container 2 171 and application 8 174 in container 3 173) and sends corresponding topology 121 data to the monitoring server 101. Transaction agents 150*f* and 150*g* are injected into processes running in those containers which monitor transaction executions performed on those processes and send the corresponding topology localized transaction trace data 120 to the monitoring server 101.

OS agent 151*g* is running on Host 7 175, which monitors 153 processes executed on host 7 and sends corresponding topology data 121 to the monitoring server 101. A transaction agent 150*h* is deployed to process application 9 176, to monitor transaction executions.

Container 4 178 is currently running on Host 8 177 and application 10 79 is executed in container 4. An OS agent 151*h* monitors 153 the container and the application process running inside the container and sends corresponding topology data 121 to the monitoring server.

Each container has its specific view of the underlying computer network, as defined in the container configurations of the individual containers, which is depicted in FIG. 1b as container network isolation 180*a* to 180*d*. Data describing those container specific views of the underlying network are also part of the topology data and the container specific network views are also described in the reported topology model 105.

Transaction T4 182 is executed and enters the monitored environment via the network isolation 180*a* of container 1 170. The sender of the incoming request to execute a portion of T4 may use an externally visible port to communicate with application 6 in container 1, which may be translated into a container internal port by the container management system. The translation of external ports to container internal ports may be performed according to a port mapping configuration that specifies a set of container internal ports that are mapped to container external ports. This port mapping data may be defined for each container and stored in container configuration data. An OS agent may read this port mapping data and send it to a monitoring server 101 as part of topology data 121. The topology model 105 may contain port mapping data for each container represented in the topology model. Application 6 receives the incoming request at the internal port, and the transaction agent 150*f* deployed to application 6 recognizes an incoming request from the container internal port. The agent 150*f* may monitor the execution of transaction 4 on application 6 and send the corresponding topology localized trace data to the monitoring server.

Inference processing on the monitoring server may analyze the tracing data describing the incoming request on application 6, use corresponding topology localization data to determine that application 6 runs in container 1, and use the network configuration data stored in the topology to find the corresponding external port for the container internal port reported by agent 150f as port used by the sender of the request to process transaction T4. The external port may together with the network address be used to identify the topology entry representing the component (i.e. a specific process) that sent the request that initialized the execution of T4 on application 6. T4 may spawn on application 4 into branch 182a and 182b. Branch 182a may continue with a request from application 6 to application 7 running in container 2. The request is first routed via the network isolation of container 1, which e.g. maps a container internal port into an external port, and then routed via the network isolation of container 2, which may map the external port to a container internal port of container 2. The agent 150f deployed to application 6 recognizes an outgoing call to a port internal to container 1 and the agent 150g deployed to application 7 recognizes an incoming call to a port internal to container 2. Corresponding topology localized transaction trace data may be sent to the monitoring server, and the inference processing on the monitoring server may use container network configuration data stored in the topology to reconstruct the path of the communication between application 6 and application 7 via the container network isolation of container 1 and container 2.

Application 7 may, to further process branch 182a of transaction T4 send a request to application 8 174 running in container 3 173. As the communication between application 6 and application 7, also this request is routed via the network isolation of both containers, causing two port mappings. However, in this case, no transaction agent is deployed to application 8. Agent 150g may send topology localized transaction trace data to the monitoring server and inference processing may use network configuration data of container 2 and container 3 to determine the internal port of container 3 addressed by the request. Inference processing may further analyze the type of the request sent by application 7 to application 8 to identify the type of the requested service (i.e. database service) and update the topology entity representing application 8 in the inferred topology model to provide the requested service at the previously identified internal pot of container 3. Inference processing may further use other topology data describing application 8 to update the portion of end-to-end transaction traced data of T3 167 that describes the communication between application 7 and application 8 (e.g. by adding data indicating the type and vendor of the database application).

The branch 182b of T4 is continued by a request sent from application 6 170 to application 9 176 running on host 7 175. As the sender of the request (i.e. application 6) is running in a container environment, and the receiver of the request (i.e. application 9) runs outside the container environment, the sender endpoint data of the request identifies a network endpoint that may not be visible for the receiver. The container management system and the networking system connection host 6 and host 7 assure that the request and the corresponding response are transferred between application 6 and application 9, even if the sender application is not directly visible for the receiver application.

Agents are deployed to application 6 and application 9, which monitor the execution of branch 182b of transaction T4. The agent 150f deployed to application 6 recognizes the sending of a request to a network endpoint (i.e. the address of host 7 and a specific port), and the agent 150h deployed to application 9 recognizes the receipt of a request from a network endpoint that is not visible from the network context of application 9.

Transaction agent 150f may add correlation data to the request, which is read by agent 150h, and both agents may add this correlation data to transaction monitoring data, e.g., in form of ingoing and outgoing trace records 470 and 480 as described in FIG. 4. The trace records are sent to the monitoring server 101 and the transaction trace processor 102 may use the correlation data to identify corresponding incoming and outgoing trace records to create end-to-end transaction trace data. The network endpoint data contained in the outgoing trace record 470 send from agent 150f, to report the branch 182a of transaction T4, is consistent with the network endpoint data contained in the network endpoint data contained in the incoming trace record 480 sent by agent 150g, as both sender and receiver agents are situated in container environments managed by the same container management component and may therefore share the same network isolation component. Therefore, network addresses and ports seen by application 6 and application 7 may be consistent. It should be noted that network isolation configurations are possible which define different network environments and different network addresses and ports for containers managed by the same container management component.

However, the reported endpoint data, sent by agent 150f to report the branch 182a of transaction T4, is not consistent with the network environment seen by host 7 and application 9, as the sender endpoint is not directly visible because it is located in container 1.

The transaction/topology inference processor 109 may analyze data stored in the reported topology model 105 showing that application 6 runs inside container 1 in combination with transaction trace data describing the communication of application 6 and application 9. This analysis may enrich the transaction trace data portion describing the sending of the request from application 6 to application 9 with data describing that the sender application 6 is executed inside container 1 and the receiver application 9 is executed outside the container environment.

To continue with branch 182b of transaction 4, application 9 176 may send a request to application 10 179 running in container 4 178 on host 8 177. Container 4 178 is isolated from the network environment visible to application 9 by its container network isolation 180d. The container network isolation 180d may be configured to map a container internal port used by application 10 179 to provide the service requested by application 9 176 to a container external port. Application 9 may send the request to the mapped container external port on host 8 and the container network isolation 180d may forward the request to the internal port used by application 10. Application 10 processes the request and sends it back to application 9 via the container network isolation 180d.

The agent 150h deployed to application 9 recognizes an outgoing request directed to a port (i.e. external port mapped to the container internal port used by application 10 to provide the service requested by application 9) on host 8 and sends corresponding transaction trace data to the monitoring server 101.

An OS agent 151*h* is executed on host 8 which monitors all running processes and all containers running on host 8 and all processes running in those containers and sends corresponding topology data to the monitoring server. In addition, OS agent 151*h* reads container configuration data of running containers including configuration data of the container network isolation, and data describing communication activities of monitored processes, like the ports on which processes are listening for incoming requests.

No transaction monitoring agent is deployed to application 10, e.g. because application 10 is implemented using a technology for which currently no matching agent is available. An example for application types for which no matching agent may be available are applications providing database services.

The transaction/topology inference processor 109 analyses transaction trace data describing sending of the request sent from application 9 to application 10 and recognizes that no corresponding transaction trace data describing the receipt of the request is available. As a next step, transaction/topology inference processing may use receiver network endpoint data reported by the agent 150*h* deployed to application 9 which sent the request. The reported receiver endpoint data contains a network address that identifies host 8 as computer system receiving the request. The reported endpoint data also contains a port that identifies the process to which the request is directed. An analysis of the topology data describing host 8 and all processes running on host 8 shows that no process is running directly on host 8 that listens on the port of the reported receiver network endpoint data. A further analysis of the reported container network isolation configuration data may show that the reported port is mapped to a container internal port on container 4 178, and a further analysis of the processes running in container 4 and the container internal ports used by those processes may show that application 10 179 listens on the mapped container internal port, which identifies application 10 170 in container 4 178 as receiver of the request sent by application 9.

As a consequence of identifying the process that received the request sent from application 9 as application 10, transaction/topology inference processing may enrich the portion of the transaction trace data of transaction T4 that describes the sending of the request from application 9 to application 10 with corresponding topology data.

As an example, data describing the outgoing request may identify the request as a request for a database service, but the monitoring data may not contain data describing details of the requested database service, like vendor, type or version of the database management system providing the database service. OS agents may, as part of process monitoring activities, read data describing running processes, like the command line used to start processes, installation and working directories of processes and configuration data used by those processes. This process description data, which is sent to the monitoring server as part of topology data, may also describe vendor, type, and version of a database management system or another type of service provided by monitored processes. The topology data processor may enrich the topology model with this process description data and transaction/topology inference processing may use this process description data of processes involved in the execution of monitored transactions to enrich the transaction trace data.

Transaction/topology inference processing may in addition enrich the topology model with data derived from the processed transaction trace data, e.g. by adding data to the portion of the topology model describing application 10 179 and container 4 that specifies that application 10 provides a database service at the previously identified container internal port.

Referring now to FIG. 2, which depicts flowcharts of processes performed by OS agents and cloud/virtualization agents to generate topology data and report it to a monitoring server. FIG. 2*a* describes the process and process communication activity monitoring as performed by an OS agent, FIG. 2*b* describes the processing of identified changes of a cloud or virtualization environment by a cloud/virtualization agent and FIG. 2*c* describes the processing of a detected container startup by an OS agent.

The processing performed by the OS agent to monitor processes running on an operating system and the communication activities of those processes starts with step 200 when an operating system with an installed OS agent starts. The OS agent is typically configured to automatically start with the start of the operating system. Following step 201 fetches or creates a unique identifier for the monitored operating system and fetches network address data from the host. The unique topology identifier may be deferred from network address data of the host and other data like e.g. a timestamp of the installation of the OS agent on a monitored host computer system to generate a value that is unique for each monitored host computing system. The OS agent may, on startup, check a known persistent storage location if such a stored identifier exists, and in case it exists, uses it. Otherwise, it may create the identifier, store it in the known persistent storage for the next start and use the created identifier.

Subsequent step 202 starts monitoring the startup and shutdown of processes running on the operating system. Monitoring process startup and shutdown may be performed by cyclically polling management data structures of the operating system that list the currently running processes. This data may be used to create topology data describing the processes executed by the operating system of the monitored host computing system.

Following step 203 may manipulate the process startup procedure used by the operating system to check on process startup if a transaction agent matching the type of the starting process is available and in response to an available transaction agent, inject the transaction agent into the starting process.

Afterwards, step 204 may start to continuously monitor communication activities of processes running on the monitored system. Monitoring of communication activities may be performed by cyclically polling operating system data structures that list the currently used network endpoints (i.e. ports) per running process. Some variant embodiments may only monitor long-living server-side listen ports (those ports are typically used by server processes providing services on a specific port and are typically reserved during the whole lifetime of the process, regardless if network communication using the port is ongoing). Other variants may also monitor short living client-side ports (those ports are only reserved during currently ongoing network communication). Yet other embodiments may instrument the network endpoint/port management component of the operating system to get notified on activities like reservation, freeing of ports by processes, setup or shutdown of network connection by processes or the data transfer over network connections, to provide more precise and detailed monitoring data of the network activities of the monitored processes. In addition to active communication activity, step 204 may also monitor the establishment and shutdown of server-side communication endpoints (i.e. listen ports on which server processes receive requests).

Following step 205 starts to cyclically send OS topology messages containing process execution and communication-related topology data of processes running on the monitored operating system. The process then ends with step 206.

The processing of received cloud/virtualization environment change events by a cloud/virtualization agent 152 is shown in FIG. 2b. Virtualization and cloud systems typically provide notification services that report changes of the cloud/virtualization environment. Those notifications may contain but are not limited to notifications reporting startup or shutdown of a cloud/virtualization node, changes of the configurations of a cloud/virtualization node and changes of the network configuration of the cloud/virtualization environment. Cloud/virtualization agents 152 may be registered as listeners for such notifications and may process such notification events as conceptually described in FIG. 2b.

The process starts with step 210 when a new environment change notification is received by a cloud/virtualization agent. Following decision step 211 determines whether the notification reports the start of a virtual host in the monitored cloud/virtualization environment. In case the start of a virtual host is notified, step 212 is executed, which may use data provided by the notification to determine a unique topology identifier for the host, fetch network address data of the started host and other data describing the host computer system, like type, specification and number of CPUs, size of main and secondary memory of the host computer system and type and version of the operating system running on the starting host computer system. In addition, the cloud/virtualization agent may fetch network isolation data, describing the network environment of the starting host computer system, like data describing a virtual private cloud (VPC) environment containing the started virtual computer system. A VPC typically isolates a portion of a cloud environment by defining access and visibility rules for incoming and outgoing communication between components inside and outside the VPN. The cloud/virtualization agent may either extract this data from the received notification, or it may, on receipt of a notification describing the start of a virtual host, access a cloud/virtualization management unit to request this data.

Following step 213 creates a virtual host topology message 430 using the data gathered in step 212 and sends it to a monitoring server 101.

Step 214 determines whether the received notification indicates the start of a virtual network traffic dispatching service.

A virtual network traffic dispatcher, like an Amazon AWS Elastic Load Balancer (ELB), typically receives incoming traffic on one or more network endpoints (i.e. network address and port) and forwards incoming traffic to one or more receiving network endpoints. Conceptually, the functionality of a virtual network dispatcher is defined by one or more network mapping tables that define how incoming traffic is distributed amongst receiving endpoints. Such a mapping table typically contain one incoming network endpoint and multiple outgoing network endpoint that receive incoming data. The virtual traffic dispatcher may distribute incoming traffic evenly to mapped receiving network endpoints, and it may, in addition, use specific dispatching rules to route incoming traffic. Such dispatching rules may connect specific parameters of incoming requests with certain receiving endpoints, and the virtual network traffic dispatcher may, on receipt of an incoming request, analyze the request and apply those dispatching rules to determine a receiving endpoint of the incoming traffic. Virtual network dispatchers are typically located at the boundary of cloud/virtualization environments to receive incoming traffic from the outside world and dispatch it to components of the cloud/virtualization environment in a controlled way.

In case the received notification reports the start of a virtual network dispatcher, step 215 is executed, which fetches data identifying and describing the virtual network dispatcher. The fetched data may include but is not limited to an identifier uniquely identifying the virtual network traffic dispatcher, data describing the mapping of incoming network endpoints to outgoing network endpoints, data describing traffic routing rules and data describing the network environment of the virtual network dispatcher, like data describing a VPC to which the dispatcher belongs.

Following step 216 creates a traffic dispatcher topology message 440 using the data extracted in step 215 and sends it to a monitoring server 101.

Subsequent step 217 checks if the received notification indicates the start of a virtual endpoint service in the cloud/virtualization environment. Cloud/virtualization environments may provide specialized network nodes that are dedicated to the provision of specific services, like file storage or database services. Those network nodes typically provide no access to an underlying host computer system. Therefore, it is typically also not possible to deploy OS agents or transaction agents to those virtual endpoint services. In case step 217 determines that the received notification reports the start of a virtual endpoint service, step 218 is executed which gathers data identifying and describing the started virtual endpoint service, which is followed by step 219 which creates a virtual endpoint service topology message 450 using the data fetched by step 217 and sends the created virtual endpoint service topology message to a monitoring server 101. The process then ends with step 220.

It is noteworthy that cloud/virtualization management and monitoring entities may send additional types of notifications, reporting other changes of the cloud/virtualization environment. The cloud/virtualization agent may handle those additional notification types in a similar way as the notifications shown in FIG. 2b, by determining an identifier for the affected cloud/virtualization entity, fetching data describing the affected cloud/virtualization entity and sending a corresponding topology message to a monitoring server which may then update its topology model accordingly. Such additional notifications may include but are not limited to notifications reporting the shutdown of a cloud/virtualization entity, notifications reporting a configuration change of a cloud/virtualization entity or notifications reporting the creation, modification or deletion of a network isolation area like a virtual private cloud.

The process of monitoring and reporting starting container environments by the OS agent is shown in FIG. 2c. The process starts with step 230 when the OS agent detects the start of a new container environment and continues with step 231 which modifies the configuration of the starting container to support the monitoring of container internal processes and the injection of transaction agents into container internal processes. Following step 232 determines a unique identifier for the starting container and fetches configuration data of the starting container, including data describing the network isolation configuration of the starting container. Subsequent step 233 creates a container topology message 420 using the data fetched by step 232 and sends the create topology message to a monitoring server 101. The process then ends with step 234. The container monitoring mechanism of the OS agent may also be configured to detect the shutdown of containers and send corresponding topology messages to a monitoring server, which may, on receipt of a message indicating the shutdown of a container, update a topology model by e.g. removing the entity describing the terminated container form the topology model.

Referring now to FIG. 3, which describes processes related to the monitoring and reporting of transaction execution activities by transaction agents 150a-150h. The monitoring of process outgoing transaction communications is described in FIG. 3a, the monitoring of process internal transaction processing is described in FIG. 3b and the monitoring of received incoming transaction communications by a process is shown in FIG. 3c.

The monitoring and reporting of outgoing transaction communication activities starts with step 300 when an agent deployed to a process that executes a monitored transaction detects an outgoing communication performed by the monitored transaction. Outgoing communication activities may be detected by sensors placed in code portions that are executed to perform outgoing communication activities, like sending a request. Those sensors are executed whenever outgoing communication activities are performed and they report the occurrence of communication activities, including details of the communication activities to the agent 150. In addition, those sensors may alter messages sent by the communication activities, e.g. by adding transaction correlation data to those messages. Following step 301 fetches local transaction correlation data which identifies the portion of the monitored transaction executed by the current process and subsequent step 302 captures the network endpoint data of sender and receiver of the outgoing communication (i.e. network address and port used by the sender to send the message and network address and port to which the sender process sends the message). Afterwards, step 303 determines the type of the outgoing communication activity and captures the communication type specific communication message. The type of the communication activity may be derived from the sensor that reported the communication activity, as different sensors may be deployed to code related to different types of transaction communication. The determined type of the communication activity typically enables the sensor or the agent to fetch and interpret the data send by the communication activity and to extract communication type specific message data.

Step 304 captures data identifying and locating the process performing the outgoing communication activity within the topology model 105 maintained by the monitoring server 101. This identifying data may contain but is not limited to data identifying the host computer system running the process, like the network address of the computer system and data identifying the process within the scope of the host computer system, like the command line used to start the process together with the name of the executable file used to execute the process, a process identifier (PID) of the process, a start timestamp of the process or a combination of some or all of them.

Following step 305 creates a transaction trace message describing the outgoing communication activity, like an outgoing trace record 470, initializes it using data fetched by previous steps and sends the created outgoing trace record 470 to a monitoring server 101 for analysis. The process then ends with step 306.

The process of monitoring process internal transaction execution activity as described in FIG. 3b start with step 310, when the agent detects process internal transaction activity. Process internal transaction activities may be detected by sensors placed to code that performs no communication activity. Following step 311 fetches or creates correlation data identifying the process local execution of the monitored transaction and subsequent step 312 captures data describing the process local transaction activity, like e.g. the execution of a method that is instrumented with sensors. Step 313 afterwards captures data identifying and locating the process performing the monitored transaction execution within the topology model 105. Further, step 314 creates a transaction trace message like a local trace record 460, initializes it with data fetched by the previous steps and sends the local trace record 460 to a monitoring server for analysis. The process then ends with step 315.

The process of monitoring incoming communication activity, as described in FIG. 3c starts with step 320 when an agent deployed to a monitored process recognizes incoming transaction communication activity. Incoming transaction communication activity may be recognized by sensors instrumented to code that processes incoming transaction activity. Following step 321 fetches transaction correlation data from the incoming communication message, which may have been attached to the communication message by step 301 of process 3a and subsequent step 322 captures local visible network endpoint data of sender and receiver of the received incoming communication message (i.e. network address and port of sender and receiver of the incoming message as seen from the receiving process). Following step 323 creates local transaction correlation data identifying the process local transaction execution initiated by the received incoming transaction communication and step 324 determines the type of the incoming communication message (i.e. by using the specific sensor reporting the incoming communication message that is instrumented to code specific to a certain communication type) and captures the received communication type specific communication message. It is noteworthy that for a communication performed between two processes, the communication message sent by a sending process and e.g. captured by an agent injected into the sending process (i.e. step 303 of process 3a) and the communication message received by the receiving process and e.ge. captured by an agent injected into the receiving process (i.e. step 324 of process 3c) may differ, because potential intermediate nodes that route and dispatch the message from the sender process to the receiver process may add data to the message. An example of such added data is the "X-Forwarded-For" header field that intermediate proxy entities may add to HTTP based communication messages.

Subsequent step 325 fetches data identifying and locating the process receiving the incoming communication message within the topology model and following step 326 creates a transaction trace message describing the incoming communication message, like an incoming trace record 480, initializes the incoming trace record with data fetched by the previous steps and sends it to a monitoring server 101 for analysis. The process then ends with step 327.

Coming now to FIG. 4 which depicts data records that may be used to transfer topology and transaction trace data from agents to monitoring servers. An OS topology record 400 as shown in FIG. 4a may be used to transfer data describing a concrete or virtual host computer system running a specific operating system and may contain and but is not limited to a topology identifier 401 that uniquely identifies the described host computing system within the topology model 105, a network address data 402 field, containing one or more network addresses of the described host computer system and other payload data 403 further describing the host computer system e.g. by specifying the number, version and speed of CPUs of the host computing system, size of main memory, data describing secondary storage of the host computing system like hard disks, data describing the capacity of network connections and type and version of the operating system of the host computing system.

A process topology record 410 as shown in FIG. 4b may be used to transfer topology data describing a process running on a host computer system and may contain but is not limited to a topology identifier 411 identifying the process within the scope of the entity executing the process (i.e. virtual or concrete host computing system or container), a topology identifier 412 identifying the entity executing the process, a network activity and endpoint data section 413 containing data describing client and server-side communication endpoints operated by the process in form of network address, port and client/server indicator and additional payload data 414 further describing the monitored process, like type of the process in form of application an platform used by the process (i.e. Oracle Java® or Microsoft .NET® application platform), type of an application server environment executed by the process and resources assigned to the process, like CPU and disk usage quotas or maximum amount of main memory assigned to the process.

It is noteworthy that a process may perform multiple network communication activities, with various counterparts, using different ports and addresses and with varying client/server role. Therefore, the network activity and endpoint data 413 may contain multiple entries, each entry describing a network communication of the process in form of a client/server role indicator of the process, and network addresses and ports of both network endpoints involved in the network communication. In addition, the network activity and endpoint data may contain data describing individual network communication activities in detail, consisting of data describing start and end time of a network communication, amount of data transferred during the communication activity in both directions and data describing the quality of the network communication e.g. in terms of delay times or number of data packet resents due to network errors that occurred during the communication activity.

FIG. 4c shows a container topology record 420 which may be used to transfer data describing a container environment executed on a host computer system. A container topology record 420 may contain but is not limited to a topology identifier 421 identifying the described container within the context of the entity containing it, like the host computing system executing the container, a topology identifier 422 of the entity containing and executing the container environment, a network mapping data field 423 containing data describing the network isolation configuration of the container, like mapped ports, container internal network address of the container, in case the container is connected to a container overlay network, name of the overlay network and data describing the overlay network. A container topology record 420 may also contain a payload data field 424 that further describes the container and that may contain data describing the type of the container environment or resources assigned to the container.

A virtual host topology record 430 as shown in FIG. 4d may be used to transfer data describing a virtualized host computing system. A virtual host topology record 430 may contain but is not limited to a topology identifier 431, identifying the described virtualized host computing system within a topology model 105, a network address data field 432 containing at least one network address of the described virtualized host computer system, a field 433 containing additional OS topology entity matching data, that may be used to identify a corresponding topology entity reported by an OS topology record 400 sent by an OS agent that runs on the virtualized host computing system, and a payload data field 434 further describing the virtualized host computing system, by specifying number, version and speed of CPUs of the virtualized host computing system, amount of main memory, data describing available secondary storage capacity like number and capacity of hard disks and data describing type and version of the operating system running on the described virtual computer system.

A typical monitoring setup of a virtualized or cloud environment contains a cloud/virtualization agent 152 which e.g. monitors the startup of virtual host computing systems and reports topology data describing those virtual host computing systems from a virtualization perspective, e.g. in form of virtual host topology records 430, to a monitoring server, which enriches a topology model 105 of the monitored environment with data describing the reported virtual host computer systems. In addition, OS agents 151 may be deployed to the virtual host computing systems, which also provide topology data to a monitoring server, e.g. in form of OS topology records 400, that describe the virtual host computing systems from an operating system perspective. The topology data processor 104 of a monitoring server 101 receives OS topology records 400 and virtual host topology records 430 and may use network address data 402/432 and optional additional OS topology entity matching data 433 to identify matching OS topology record/virtual host topology record pairs describing the same virtual host computing system. The topology data processor may merge such identified topology record pairs and use them to create one topology entity representing the virtual host computing entity that describes both its virtualization and OS aspects.

Topology data describing virtual traffic dispatcher entities, like cloud load balancers may be transferred using virtual network traffic dispatcher records 440 as shown in FIG. 4e. A virtual network traffic dispatcher record 440 may contain but is not limited to a topology identifier 441 identifying the described virtual traffic dispatcher within a topology model, a network mapping data field 442, e.g. in form of one or more mappings that map input network addresses and ports to one or more output addresses and ports and a payload data field 443 further describing the virtual traffic dispatcher, e.g. by its type or capacity (e.g. max number of requests per time interval).

Virtual endpoint service records 450, as shown in FIG. 4f may be used to transfer data that describes virtual endpoint services, like database or file storage services provided by cloud/virtualization environments. A virtual endpoint service record 450 may contain but is not limited to topology identifier 451 identifying the described virtual endpoint service in a topology model, a network endpoint data field 452 containing data describing the network endpoints at which the provided services can be accessed and a payload data field 453 that further describes the virtual endpoint service by specifying its type (e.g. database or file storage service), or its maximum and currently used capacity.

Data records that may be used to transfer transaction trace data are shown in FIGS. 4g, 4h, and 4i. Transaction traced data describing process local transaction activities may be transferred using a local trace record 460 as shown in FIG. 460. A local trace record 460 may contain but is not limited to a local correlation data field 461 uniquely identifying the portion of a monitored transaction performed by a specific process, a process topology identifier field 462 identifying the process on which the transaction execution was performed within a topology model 105 and a payload data field 463 containing data that further describes the monitored portion of the transaction execution, like names of called methods and execution performance data of those methods, resources used for the transaction execution, like allocated memory or required CPU cycles.

Transaction execution activities that perform process outgoing communication activities, like the sending of requests to other processes, may be transferred using outgoing trace records 470 as described in FIG. 4h.

An outgoing trace record 470 may contain but is not limited to local correlation data 471 identifying the portion of the monitored transaction execution that performed the outgoing communication activity, a topology identifier 472 identifying the process executing the transaction, a client-side network endpoint data field 473 containing data describing the sender and receiver network endpoint (network addresses and ports) as seen by the sending process and a communication data field 474 containing data describing the type of the performed outgoing communication activity (e.g. by specifying the application-level protocol used to send the message, like HTTP) and the sent communication message (e.g., for HTTP based communication, the data describing the sent HTTP request).

Data describing incoming communication activities, like requests received by processes, that start the execution of a portion of a monitored transaction by the received process, may be transferred using incoming trace records 480 as shown in FIG. 4i. An incoming trace records 480 may contain but is not limited to a local correlation data field 481 uniquely identifying the portion of the transaction execution performed by the receiving process to handle the incoming communication activity, a sender correlation data field 482 containing an identifier for the portion of the monitored transaction performed by the process that sent the incoming communication message, a topology identifier 483 identifying the receiving process within a topology model 105, a field 484 to store receiver side network endpoint data in form of network addresses and ports of sender and receiver of the communication activity as seen by the receiver process and a field 485 to store communication type and communication message as received by the receiver process.

The topology and trace records described in FIG. 4 may be used to send topology and transaction monitoring data from agents deployed to the monitored environment (e.g. transaction agents 150, OS agents 151 or cloud/virtualization agents 154) to a monitoring server 101.

Referring now to FIG. 5 which shows data records that may be used by a monitoring server 101 to describe and store topology models and end-to-end transactions. FIGS. 5a, 5b, 5d, and 5e describe such records in detail. FIGS. 5c and 5f show their usage by an example.

A topology node 500 as shown in FIG. 5a may be used to represent a topological entity in a topology model 105 maintained by a monitoring server 101. A topology node 500 may contain but is not limited to a topology identifier 501 identifying the topology node within the topology model, a parent topology node identifying 502 a parent or enclosing topology node of a given topology node (e.g. for a topology node describing a process, the parent topology node identifier would identify the topology node representing the host computing system on which the process is executed), an entity type field 503 specifying the type of the described topology entity (e.g. process, host computing system, virtual traffic dispatcher etc.), a type specific network data field 504, containing network data that is available for the specific entity type (e.g. network addresses for host computing systems, network addresses and port for processes) and type specific additional data field 505 which contains data that further describes the topology entity (e.g. assigned resources, and data describing the functionality of the process, like executable name, command line to start the process and configuration data for process entities, network configuration data for container entities, available resources and configuration data for host computing system entities and network traffic mapping configuration data for network traffic dispatcher entities).

Topology communication nodes 510 as shown in FIG. 5b may be used to describe communication activities between topology entities. A topology communication node 510 may contain but is not limited to a client topology identifier 511 identifying the topology entity that initiated the communication, a server topology entity identifying the topology entity that received and served the communication activity and a communication type field 513 containing data further describing the communication activity (e.g. TCP/UDP in case only low-level communication data is available, or in case application level data is available from transaction monitoring, the application level protocol, like HTTP for web browser or web service related communication or JDBC/ODBC for database service related communication).

A processing trace node 520 as shown in FIG. 5d may be used to describe portions of a monitored transaction execution that were executed by a specific process. A processing trace node 520 may contain but is not limited to a correlation data field 521 identifying the portion of the monitored transaction, a topology identifier 522 identifying the process executing the portion of the monitored transaction and a payload data field 523 describing details of the execution, like performance data of executed methods, resources used for the execution, execution context data like values of method parameters or method return values.

A communication trace node 530 as shown in FIG. 5e may be used to describe a monitored communication between two processes performed during the execution of a monitored transaction. A communication trace node 530 may contain but is not limited to a communication type field 531 describing the type of the monitored communication (e.g. by the used application level protocol like HTTP, RMI or JDBC/ODBC), a sender data field 540 and a receiver data field 550.

Sender data 540 and receiver data 550 may contain but are not limited to a correlation data field identifying the portion of a monitored transaction acting as the sender of the communication activity 541 (sender data 540) and identifying the portion of the monitored transaction acting as the receiver 551 of the communication activity (receiver data 550), a field containing network communication endpoint data (i.e. sender and receiver network endpoint and port data) as seen from the sender side 542 and the receiver side 552 and a field containing a captured communication side as seen from the sender side 543 and the receiver side 553. A communication trace node 530 may also contain an intermediate topology node identifier list 560 which may be populated with topology identifiers of topology entities representing identified intermediate nodes during the transaction/topology inference processing as described in FIGS. 8 to 14.

It is noteworthy that the network infrastructure may route and dispatch network traffic between a sender and a receiver process. On a logical, application level, sender and receiver are connected directly. On a network connection level, the sender process communicates with the first routing/dispatching entity and the receiver process communicates with the last routing/dispatching entity in a chain of routing/dispatching entities that connect sender and receiver. As performance problems may also arise from such routing/dispatching entities, it is important for a performance monitoring tool to detect and identify such routing/dispatching entities that are involved in the execution of a monitored transaction. Captured network level communication endpoint data as seen on sender and receiver side may be used to detect the existence of such intermediate routing/dispatching entities.

FIG. 5c shows a portion of a topology model describing a host computer node running a process that communicates with a process running on another host computer. Topology node 500a describes a host computing system with topology identifier 501a set to "Host A", a not set parent topology identifier indicating that no enclosing topology entity exists for the host computing system, an entity type 503a set to "Host" indicating that the topology node describes a host computing system and a network data field 504a set to "Address B" indicating that the network address of the host computing system is "B". The type-specific additional data 505a is omitted. Topology node 500b describes a process with topology identifier 501b "Process C" and a parent topology identifier 502b "Host A" indicating 560 that process "Process C" runs on "Host A". The entity type 503b indicates a process, and the network address data 504b indicates that "Process C" uses port 1 to communicate with another process. Topology communication node 510a further describes this communication and links 561 and 562 client process 500b and server process 500c. The client identifier 511a identifiers "Process C" as client process that initiated the communication, e.g. by sending a request. The client identifier field 511a may, in addition, contain data describing the port (i.e. port 1) used for the communication. The server identifier field 512a identifies "Process D" as server-side of the communication and it may also contain data describing the port that was used by the server process to receive the communication message (i.e. port 2). The processes may use TCP to transport the message, and the communication type 513 may be set accordingly. Topology node 500c describes the receiving process by its topology identifier 501c, its parent topology identifier 502c which describes that "Process D" runs on host "Host E", its type 503c and its network address data 504c.

Typically, communication between processes relies on a stable server-side port that receives requests and uses arbitrary client-side ports. Therefore, the client-side port information is less relevant than the port on server-side. Some variant embodiments may therefore only store server-side port data.

An exemplary portion of an end-to-end transaction trace is shown in FIG. 5f, which shows a communication between two monitored processes and an outgoing communication from a monitored process to a not monitored entity.

Processing trace node 520a represents transaction execution activities identified by correlation data 521a "A", performed on a process with topology identifier "Process E" 522a. The monitored transaction execution on process E sends an RMI (remote method invocation) request to a process with topology identifier "Process F". The monitored transaction execution performed on process F is represented by processing trace node 520b with correlation data 521b "B" and topology identifier "Process F". Communication Trace node 530a describes this RMI call and links 563 and 564 the corresponding transaction execution portions performed on process E and F. The communication type 531a is set to indicate an RMI request, the correlation data 541a of sender data 540a identifies the transaction execution portion described by processing trace node 520a as sender. The communication endpoint data 542a indicates "H" as sender address (i.e. address host executing process E), and that port 3 was used on the sender side to send the message. Further, the communication endpoint data indicates "I" as receiver address and the usage of port 4 to receive the message. The communication message 543a identifies "X" as the name of the method that is executed remotely. The correlation data 551a of the receiver data 550a identifies the portion of the transaction executed on process F as receiver of the message and communication endpoint data 552a and communication message is identical to the corresponding sender data (542a and 543a), which indicates that no intermediate node was involved in the transfer of the communication message.

Transaction processing on process F causes the sending of a database query, which is described by communication trace node 530b. The communication type 531b indicates a database query, and the sender data identifies and links 565 the transaction processing on process F 520b with the request. In addition, the sender data indicates that the request was sent from address "I" and port 5 to address "J" and port 6. The communication message 542b may contain the sent database query. There may be no transaction agent 150 deployed to the process receiving the request, therefore the receiver data 550b is empty 566.

Referring now to FIG. 6 which describes the processing of topology events as described in FIGS. 4a to 4f by the topology data processor 104. FIG. 6a shows the processing of incoming topology records and FIG. 6b describes the identification and reporting of not monitored entities of a monitored environment using network level communication data received with topology records.

Processing of topology records starts with step 600 when a new topology record is received by the topology data processor. Subsequent step 601 queries the topology model 105 if a topology node 500 with a topology identifier 501 matching the topology identifier of the received topology record exists in the topology model. In case no such topology node exists, a new one is created in step 603, and its topology identifier 501 and payload data 505 are set to the corresponding data from the received topology record. Following step 604 sets the type-specific network data 502 (i.e. network address for host computing systems, host address and ports for processes). Step 606 sets the parent topology identifier 502 of the created topology node to the parent topology identifier reported by the received topology record. In case no parent topology identifier is reported, the topology identifier 502 is set to a value indicating no parent topology entity. Afterwards, step 607 is executed, which analyzes the communication activity data received with the topology record (i.e. network activity and endpoint data 413 received with a process topology record 410) and creates corresponding topology communication nodes 510.

As an example, a process topology record 410 may be received that contains network activity data 413 describing communication of the process as client role with a server-side endpoint specified by a network address and a port. The network address may be used to identify the topology entity representing the host computing system on which the server process is running and the port may be used to identify the topology entity representing the server process. Port numbers are unique on an operating system and data describing the usage of ports by processes running on operating systems which may be captured by an OS agent may be used to identify the process corresponding to the port number. After the topology entities representing both client-side and server-side process are identified, a corresponding topology communication node 510 may be created. In case no topology entity for one of the communication endpoints is found, the received network endpoint data for the not resolved topology entity may be stored in the corresponding field of the created topology communication node (i.e. client topology identifier 511 or server topology identifier 512) together with an indicator that the topology entity is not yet resolved for later resolving or other processing.

The process then ends with step 608. In case step 601 identified an existing topology node with a topology identifier 501 matching the topology identifier of the received topology record, step 609 is executed, which updates payload data and type-specific network data of the topology node found in step 601 with corresponding data from the received topology record. The process then continues with step 607.

FIG. 6b shows an exemplary method to identify and report not monitored entities in a monitored environment. Such not monitored entities may e.g. arise when the operator of the monitored environment forgets to place agents on those entities. The process begins with step 610 when a topology communication node 510 is created and no corresponding topology node for one of the network addresses of the described communication was found. Following step 611 queries the topology model 105 for a topology communication node 510 with an adjacent unresolved endpoint matching the new received unresolved endpoint (e.g. new topology communication node has an unresolved server-side endpoint, 611 queries for existing topology communication nodes with unresolved client-side endpoint with same address as unresolved servers-side endpoint of new topology communication node). In case no matching topology communication node is found, the process ends with step 616. Otherwise, step 613 is executed which performs checks to determine if the unknown intermediate node (not represented in topology model but seen as a server and as client part of monitored low-level communications) is monitorable. As an example, step 613 may compare the network address of the unknown intermediate node with an address range describing the available network addresses of the monitored environment. In case the network address of the unknown intermediate node is within the address range, step 613 may indicate that the unknown node is monitorable. Otherwise, it may indicate that it is not monitorable. In case step 613 indicates that the unknown node is not monitorable, the process ends with step 616. Otherwise, step 615 is executed which indicated the unknown intermediate node as monitoring candidate, e.g. by sending a message containing its network address to the user of the monitoring system. The process then ends with step 616.

Coming now to FIG. 7 which describes the processing of transaction trace records as described in FIGS. 4g to 4i by the transaction trace processor and the identification of finished end-to-end transaction trace records.

The processing of transaction trace records, as shown in FIG. 7a starts with step 700 when a new transaction trace record is received by the transaction trace processor 102. Following step 701 determines if the received transaction trace record is a local trace record 460. In this case, step 702 is executed which creates a processing trace node 520 and stets its correlation data 521, topology identifier 522 and payload data to corresponding data from the received local trace record 460. The process then ends with step 704. In case step 701 determines that the received transaction trace record is no local trace record, step 705 is executed which determines if the received transaction trace record is an outgoing trace record 470. In this case, step 706 is executed which creates a new communication trace node 530 and sets its communication type according to the communication type reported by the received outgoing trace record. Following step 707 sets communication endpoint data 542, communication message 543 and correlation data 541 of the sender data section 540 to the corresponding values of the received outgoing trace record. The process then ends with step 708.

In case step 705 determined that the received transaction trace record is nooutgoing trace record, the process continues with step 709 which determines if the received transaction trace record is an incoming trace record 480. In this case, step 710 is executed, which fetches a communication trace node 530 with correlation data 541 of the sender data 540 matching the sender correlation data 482 of the received incoming trace record 480. Following step 711 sets correlation data 551, communication endpoint data 552 and communication message 553 of the receiver data section 550 of the fetched communication trace node to the corresponding values of the received incoming trace record 480. The process then ends with step 712.

The process identifying finished end-to-end transaction traces and the marking of such end-to-end transactions as ready for topology inference processing is shown in FIG. 7b. The process is executed cyclically and starts with step 720 when a specific time (5 seconds, 1 minute) since its last execution is elapsed. Following step 721 identifies those end-to-end transaction traces for which no more additional trace data can be expected. Step 721 may e.g. determine the time when the last trace record was received for a transaction. In case this time is longer than a specific time period (e.g. 1 minute, 5 minutes) in the past, the end-to-end transaction trace may be identified as finished. Following step 722 may mark finished end-to-end transaction traces identified by step 721 as ready for topology inference processing. Such marked transactions may be forwarded to the transaction/topology inference processor 109 for further analysis. The process then ends with step 723.

Coming now to FIG. 8 which conceptually describes the overall transaction/topology inference process. The process is performed for each communication trace node 530 contained in an end-to-end transaction trace record and starts with step 800 when a new finished end-to-end transaction trace record is received by the transaction/topology inference processor 109.

Following step 801 checks if the currently processed communication trace node 530 contains sender data 540. Sender data 540 may not be available for a call from a not monitored process that initiated the execution of a monitored transaction. In case no sender data is available, the process continues with step 806.

Otherwise, step 802 is executed, which analyzes the communication endpoint data 542 of the sender data 540 to find the topology entity representing the receiver of the communication activity as seen from the sender process. This analysis process is described in detail in FIG. 9. Possible outcomes of this analysis are an indication that no corresponding topology entity is available in the topology model, that a network node level topology entity was found (i.e. load balancer entity or proxy appliance entity for which no monitoring data of executed processes is available) or that a process level topology entity was found (e.g. proxy process running on a monitored host).

In case step 803 indicates that no corresponding topology entity was found for the receiver network endpoint reported by the sending process, step 804 is executed which updates the currently processed communication trace node and the inferred topology to represent the discovered not monitored entity. Details of the processing performed by step 804 can be found in FIG. 10.

Step 805 is executed when step 803 indicates that a corresponding topology entity was found for the receiver network endpoint reported by the sender side of the currently analyzed transaction communication. Step 805 marks the topology entity that was identified as receiver of the transaction communication as provider of the service corresponding to the type of the sent communication message (e.g. in case the type of the communication message is RMI, the identified receiving topology entity may be marked as provider of an RMI service) and enriches the communication trace node with data from the identified receiver entity (e.g. by appending the topology identifier of the identified topology entity to the intermediate topology node identifier list). A detailed description of the processing performed by step 805 can be found in FIG. 11.

Step 806 is executed after step 804 or 805, which determines if receiver data 550 is available in the currently processed communication trace node 530. Receiver data may not be available for transaction communication sent from instrumented processes to not instrumented receiver processes. In case of not available receiver data, the process ends with step 808.

Otherwise, the receiver side communication message 553 may be analyzed by step 807 for data indicating intermediate nodes between sender and receiver (e.g. XFF header data for HTTP based communication), corresponding topology entities for indicated intermediate nodes may be determined and the currently processed communication trace node and the inferred topology model may be updated to represent the identified intermediate nodes. A detailed description of the processing performed by step 807 can be found in FIG. 12. The process then ends with step 808.

Coming now to FIG. 9 which describes the analysis of communication endpoint data 542 representing the network endpoints of a monitored communication as seen from the client-side. Communication endpoint data 542 consists of a network address and a port of the client/sender side and a network address and a port for the server/receiver side. The process begins with step 900 when communication endpoint data 542 is received for analysis. Following step 901 fetches the topology entity corresponding to the sender endpoint. Step 901 may first fetch the topology identifier 522 of the processing trace node 520 describing the process side processing that sent the message and then use this topology identifier to fetch the corresponding topology node describing this process.

Following step 902 determines whether the sending process was executed in a container environment. Step 902 may use topology data to determine whether the sending process was executed in a container environment. OS agents 151 monitor containers and processes running on operating systems and also detect whether processes are executed directly on the operating system or in a container environment. Process id (PID) mapping data that maps operating system level PIDs to container level PIDs may be used for this determination. The OS agent may send topology data describing which processes run in which container to the monitoring server which creates a corresponding topology model. Topology nodes 500 contain a topology identifier that uniquely identifies a topology entity. Transaction trace data contains the topology identifier of processes involved into the processing of the transaction. Therefore, the transaction trace data also contains the topology identifier of the sending process. The topology identifier of the sending process may be used to identify the topology node representing the sending process. The parent topology identifier 502 may be used to identify the topology node representing the parent topology entity of the process. In case the sending process was executed in a container, the parent topology node represents a container, the process was executed in a container, and container specific network access restrictions may apply. Data describing those container specific network access restrictions may be stored in the topology node representing the container. In case the parent topology node represents an operating system, the sending process was executed in the context of the operating system.

Subsequent step 903 evaluates sender side network access and visibility restrictions arising from the container status (i.e. in case the process is executed in a container environment, other containers and processes in those other containers may be visible according to the network configuration of the container environment which are not visible from outside the container, and the container network configuration may restrict the accessibility of network components outside the container environment) or from other access and visibility restricting network configurations like virtual private clouds to identify topology entities that are reachable by the sender process.

Subsequent step 904 queries those topology entities from the set of topology entities reachable by the sender process that was determined by step 903 that have a network address that matches the reported receiver address. Step 904 may further consider known traffic dispatcher components between reported sender and receiver endpoint by determining for the reported receiver network endpoint if the corresponding topology entity is a traffic dispatcher. In this case, the topology identifier of the traffic dispatcher may be added to the intermediate topology identifier list 560 of the currently processed communication trace node and the target topology nodes of the traffic dispatcher (i.e. those topology elements to which the traffic dispatcher routes incoming communication according to captured traffic mapping data) may be added to the list of reachable topology entities.

Following step 905 may, in case the query performed by step 904 resulted in multiple matching topology entities use heuristics, like a match between the service requested by the sent message and services provided by the identified topology entity candidates, or matching timing between observed TCP level communication and the reported sending time of the request to determine the best matching receiver entity.

Afterwards, decision step 906 checks whether a matching receiver topology entity was found. In case no matching receiver topology entity was found, step 913 is executed, which indicates that no receiver topology entity is available. The process then ends with step 914.

In case a matching receiver topology entity was found, step 907 determines if process level data is available for the identified receiver topology entity. Process level data may not be available for topology entities of virtual endpoint services like database or file storage services because such entities are typically not monitorable on a process level. If no process level data is available, step 909 is executed which indicates the found network node entity as topology entity corresponding to the receiver endpoint data.

If otherwise, process level data is available for the identified receiver topology entity, step 908 is executed which uses the reported port of the receiver endpoint data to determine whether the port directs to a process or a container. Step 908 may use captured container port mapping data to determine if the reported receiver port matches a mapped container port. If no matching mapped container port is found, step 912 is executed which identifies the process corresponding to the receiver endpoint and indicates the identified process as topology entity corresponding to the receiver endpoint data. the process then ends with step 914.

In case of a match with a mapped container port, step 911 is executed which uses the captured port mapping data to determine the corresponding port inside the container. Following step 912 then uses this corresponding container inside port to identify the receiving process inside the container and indicates this process running inside the container as topology entity corresponding to the receiver endpoint data. The process then ends with step 914.

Referring now to FIG. 10 which describes the process of handling reported network addresses for which no corresponding topology entity was found in the topology model. The process starts with step 1000 when no matching topology model entity was found for a network address reported in sender data 540 communication endpoint data 542 or receiver data 550 communication endpoint data 552. Following step 1001 creates a new topology node 500 with an entity type 503 indicating an operating system/host computing system environment, sets the type-specific network data 504 to the reported network address for which no corresponding topology entity was found, and marks the created topology entity as unmonitored entity (e.g. by setting the type-specific additional data 505 to a value indicating an unmonitored entity).

Following step 1002 adds the created topology node 500 to the topology model 105 (some variant embodiments may add topology nodes 500 describing not monitored entities to the inferred topology model 106) and adds known horizontal and vertical relationships of the unmonitored entity to the topology model.

In case a topology entity describing a virtualized host system (e.g. entity type 503 indicating a virtual host system), as e.g. reported by a cloud/virtualization agent 152, with type-specific network data 504 matching the reported network address is available in the topology, the topology node describing the virtualized host system may be combined with the created topology node describing the unmonitored entity, e.g. by setting the parent topology identifier 502 of the created topology node to the topology identifier 501 of the topology entity describing the corresponding virtualized host system. This indicates the situation that a new virtualized host computer system was started in a monitored environment and the startup of the new virtualized host computer system was monitored by a cloud virtualization agent 152, but there is yet no OS agent 151 installed on the virtual host computing system. Such an indication may later (e.g. step 1006) be used to determine if a notification about the detection of a not monitored but monitorable entity of the monitored environment should be sent to the user. Step 1002 may further add a topology communication node 510 to the topology model that describes the reported transaction communication with the new unmonitored topology entity (e.g. for a monitored incoming transaction communication, from the new, unmonitored topology node to the topology node representing the known receiver of the transaction communication and for a monitored outgoing transaction communication, from the topology node representing the known sender of the transaction communication to the new, unmonitored topology node).

Following decision step 1003 determines whether the currently processed communication trace node describes a transaction communication that was monitored on both sender and receiver side (i.e. a transaction agent 150 deployed to process initiating the communication and to process serving the communication), and executes step 1005 in this case, which marks the communication trace node as routed via an unknown intermediate node, e.g. by appending the topology identifier 501 of the topology node created by step 1001 to the intermediate topology node identifier list 560 of the currently processed communication trace node.

In case either sender side or receiver side is not monitored by an agent, step 1004 is executed. In case the sender side is not monitored, the sender data 540 of the currently processed communication trace node may be linked to the topology node representing the new unmonitored entity, e.g. by appending a field "unmonitored topology identifier" to the sender data 540 and setting it to the topology identifier 501 of the topology node created in step 1001. In case the receiver side is not monitored, such a field may be appended to the receiver data 550 and then also set to the topology identifier 501 of the newly created topology node.

Step 1006 is executed after step 1004 or 1005, which evaluates criteria for the notification of the identified unmonitored entity. Typically, a notification of an unmonitored entity should only occur when evidence for the usage of the unmonitored entity in a monitored transaction is available, and the available data describing the unmonitored entity indicates that it is possible to monitor the currently unmonitored entity. Such criteria evaluated by step 1006 may contain but are not limited to a network address range, describing a set of network addresses that are within the monitored environment and determining whether the address of the unmonitored entity is within this address range, and the existence of a topology node describing a virtual host computing system with an address that matches the address of the unmonitored entity. For identified unmonitored entities on process level, those criteria may also include evaluation of a message type sent to or received from the unmonitored entity and determining, based on the message type, the type of process sending or receiving the request (e.g. process providing database services), and determining based on the type of the process whether a transaction trace agent 150 for this type of process is available.

In case the notification criteria evaluated by step 1006 are fulfilled, step 1008 is executed which notifies the user of the monitoring system about the detection of an unmonitored entity in the monitored environment that is involved in the execution of a monitored transaction and that may be monitored by instrumenting it with an agent. The process then ends with step 1009. In case the notification criteria are not fulfilled, the ends with step 1009 without sending a notification.

Coming now to FIG. 11 describes the processing performed by the inference processor during in case sender data 540 is available for a currently processed communication trace node 530, and a topology node was found in the topology model that matches the receiver address received in the communication endpoint data 542 of the sender data 540. The process starts with step 1100 when a topology entity for a received client-side reported transaction communication receiver is was found in the topology model 105.

Following step 1101 analyzes the client-side captured data describing the communication activity, like communication type and communication message to determine the type of requested service (e.g. communication type JDBC/ODBC indicate a requested database service, communication type RMI indicate a requested remote method invocation service).

Subsequent step 1102 may determine if the receiver entity is a traffic dispatcher, like a load balancer 133. Step 1102 may e.g. use the entity type field 503 of the found topology node representing the sender side reported receiver of the communication activity for this determination.

In case the receiver is no traffic dispatcher, step 1110 is executed which uses data stored in the topology node corresponding to the receiver side to enrich the receiver part of the communication trace node. As an example, the type of the communication trace node may indicate the request of a database service and the topology data describing the process that received and processed the request may identify the type, vendor and version of the database server executed by the receiver process. Step 1110 may add this data to the communication trace node to refine the transaction trace data with type, vendor, and version of the database server to which the database service request was directed.

Step 1110 may, in addition, link the communication trace node describing the request with the topology node representing the process serving the request. This linkage may later be used by an automated causality and root cause detection mechanism to identify potential context conditions on the process serving the request, like a high CPU load during the time at which the request was serviced, to identify a longer than expected time required to process the request.

Following step 1111 may use data extracted from the communication trace node to improve the topology model. As an example, a communication trace node 530 specifies a communication type 531, which corresponds to a type of requested service, and the communication endpoint data specifies which address and which port was used to request this service. Topology data may only contain data describing at which communication ports the receiving process is waiting for incoming requests, but it may not contain data describing an assignment of ports to service types. The data from the communication trace node determines the port at which the service corresponding to the communication type 531 was requested. The topology node representing the receiving process may be updated accordingly by adding descriptive data indicating that the port used by the communication trace node provides the service corresponding to the communication type.

As an example, the topology model may provide data about process "A" indicating that it runs a database server (this may be determined by analyzing the name of the executable used by the process and the command line of the process) and that process "A" listens for incoming requests at ports 1,2,3 and 4. A communication trace node may specify port 2 as the port used by a request for a database service. Step 1111 may then add data to the topology model describing process "A" that indicates that port 2 provides a database service.

After step 1111 the process ends with step 1112.

In case step 1102 determined that the receiver is a traffic dispatcher, step 1103 is executed, which uses reported dispatcher mapping data (see e.g. network mapping data 442 of virtual traffic dispatcher record 440) to identify a set of potential receiver endpoints to which the dispatcher could have forwarded the request according to its mapping data. As traffic dispatchers may be chained, and the entities to which a traffic dispatcher forwards received requests may also be traffic dispatchers, step 1102 may be executed recursively in case the topology entities to which a traffic dispatcher routes requests are also traffic dispatchers, until the entities to which traffic is dispatched are no longer traffic dispatchers.

Following step 1104 fetches the topology entities representing potential receiver endpoints to which dispatchers that received the transaction message may have forwarded the transaction message. Traffic dispatchers are typically configured to receive requests on one specific network endpoint and to forward received requests to one of a set of potential receivers. Traffic dispatchers may use various strategies to select a receiver for an incoming request, like a round robin strategy that sends each request to another receiver or load based strategies that monitor load parameters of potential receivers of incoming requests and send incoming requests to the receiver with the least load.

Therefore, a request received by a traffic dispatcher may be forwarded to and received by one of a set of potential receivers. The traffic dispatcher mapping data captured by agents deployed to the monitored environment defines the set of potential receivers of a request, but the mapping data alone does not provide data to identify the actual receiver of the request. Therefore, step 1104 first determines those potential receivers by their network endpoint (i.e. network address and port) and determines for those network endpoints if they represent a process or a container. In case the network endpoint represents a container, captured container port mapping data may be used to identify the receiver process inside the container. In case no corresponding topology entities are found for one or more of the identified target network endpoints of the traffic dispatcher, those network endpoints with no corresponding topology entity are processed as described in FIG. 10.

Following decision step 1105 determines if data is available to identify the topology entity that received the transaction communication message described by the currently processes communication trace node. Step 1105 may determine if receiver data 550 is available in the communication trace node, which indicates that the corresponding communication message was received by a process that was instrumented with an agent and that a processing trace node 520 exists that describes the processing of the communication message on the receiving process. In case no receiver data is available, step 1105 indicates that the receiver entity could not be identified and the process continues with step 1107. Step 1107 is executed when no data to identify the receiver process of the transaction message is available and the message was routed via one or more traffic dispatchers and any process to which the traffic dispatchers may have routed the message is a potential receiver of the message. The currently processed communication trace node may, in this case, be adapted by appending a list containing the topology identifiers of those potential receivers which may be interpreted as "one out of n" selection by a later processing stage, like an automated causality and root cause detection mechanism. Further, the communication trace node may be adapted by appending a tree data structure describing the potential routing variants of the message via the involved traffic dispatchers. As an example, the message may first be sent to traffic dispatcher "A", which may have forwarded it to dispatcher "B" or "C", and dispatcher "B" may have forwarded the message to dispatcher "D" or dispatcher "E". The root node of the tree structure may, in this case, identify dispatcher "A", which has two child nodes "B" and "C", and "B" would again have child nodes "D" and "E". This tree structure describes all possible routes of the message through the involved traffic dispatchers. A later processing stage like a like an automated causality and root cause detection mechanism may use this data structure to calculate impact probabilities of an outage of one or more of those traffic dispatchers on the sender of the dispatched message.

If step 1105 otherwise determines that receiver data 550 is available in the communication trace node, it may use the correlation data 551 stored in the receiver data 551 to fetch the processing trace node 520 with a matching correlation data 521 and use the topology identifier 522 of the processing trace node 520, which identifies the topology element representing the process that received the transaction message, to indicate the topology entity representing the process as receiver of the transaction message. In this case, the process continues with step 1106.

Step 1106 may use the topology node representing the receiver of the message to determine a route of the message through the involved traffic dispatchers. In case a message is routed via multiple traffic dispatchers those traffic dispatchers typically form either a chain (one dispatcher is connected to the next dispatcher until the final receiver is reached) or in a tree (the first dispatcher dispatches to n following dispatchers and so on). In case of a chain structure, the route of the message is unambiguous. In case of a tree structure, step 1106 may use the network endpoint data of the receiver of the message to identify the dispatcher from which the message was sent to the receiver, and the mapping data of the identified dispatcher to identify the dispatcher from which it received the message and so on until the original sender of the message is reached to determine the route of the message through the dispatchers. Step 1106 may then append the topology identifiers of the identified traffic dispatchers that forwarded the message to the intermediate topology node identifier list 560 of the currently processed communication trace node 530.

Step 1108 is executed after step 1106 or 1107 and marks topology entities determined by step 1103 as potential receivers of the message as providers of the service requested by the message. As the traffic dispatchers may have delivered the message to any one of the topology entities identified by step 1103, all those entities must be capable to provide the service requested by this message. In a more concrete example, topology data as e.g. provided by OS agents and cloud/virtualization agents may show that a traffic dispatcher "A" dispatches incoming traffic on port 2 to port 1 on host "B" and "C", and that those ports relate to process "X" on host "B" and process "Y" on host "C". In case a transaction message requesting a specific service, like an "HTTP" service was sent to port 2 of dispatcher "A", the request for an "HTTP" service may have been dispatched to process "X" or "Y" on port 1. Therefore, it can be concluded that both process "X" and "Y" provide an HTTP service on port 1. After step 1108 the process ends with step 1109.

Coming now to FIG. 12 which describes the processing of the communication type 531 and the receiver side communication message 553 of the currently processed communication trace node 530 to find evidence for intermediate nodes, like proxy components, that routed the communication message from the sender to the receiver. The process starts with step 1200 when a communication trace node is received that contains receiver data 550 and that has a communication type that indicates the possibility of portions of the communication message that describe intermediate nodes. An example of such a communication type is HTTP, and examples for a portion of the communication message describing intermediate nodes are XFF (X-Forwarded-For) or Forwarded HTTP Extension headers.

Following step 1201 tries to extract data describing intermediate nodes from the captured receiver-side communication message. For a communication message following the HTTP protocol, this may be performed by extracting the values corresponding to a XFF header or headers defined by the Forwarded HTTP Extension from the communication message. Subsequent decision step 1202 checks if such data is available, e.g. by checking if the extraction performed by step 1201 provided data.

In case no data describing intermediate nodes is available, step 1210 is executed, which analyzes sender and receiver side network endpoint data in conjunction with known topology data determine if intermediate nodes between sender and receiver may exist and, in case such intermediate nodes may exist, tries to identify the topology entities representing those intermediate nodes. A detailed description of the processing performed by step 1210 is found in FIG. 14. Afterwards, the process ends with step 1211.

If step 1202 otherwise determines that data describing intermediate nodes is available, step 1203 is executed which fetches data describing the first sender of the message from the data describing intermediate nodes. An XFF header field contains a comma-separated list of the network addresses of senders from which intermediate proxy components in a proxy chain directly received a request. As an example, a sender with address "sender" may send a message to a proxy with the address "proxy1", which forwards it to "proxy2". The proxy component "proxy2" forwards the request to the receiver. The XFF field may be set by "proxy1" to "sender", as it received the message from a network address "sender". Afterwards, "proxy2" may append the network address of the sender from which it receives the message, which is "proxy1" to the XFF field, which has then the value "sender, proxy1" before the message is forwarded to the receiver. Proxies using the HTTP Forwarded Extension may add further data like the used protocol and sender/receiver ports to the request message. HTTP Forwarded Extension may also contain data describing the proxy component receiving and processing a request message. In the above example, the data generated by the HTTP Forwarded Extension would also contain data describing "proxy2", the last proxy component in the proxy chain. It is noteworthy that providing XFF or HTTP Forwarded data is optional and there may proxy components exist in a proxy chain that do not add this data to a request. Other data, like transaction reported communication endpoint data and reported topology data, may be used to deduce the existence of such proxy components and to further identify entities of the topology model describing those proxy components.

As the first entry of XFF or HTTP Forwarded data identifies the network address of the original sender of the message, and the sender data 540 of the currently processed communication trace node 530 contains data describing the network address of the sender, step 1204 may compare both network addresses to determine if a not reported intermediate node may have processed the transaction message before the first proxy component that added proxy identification data (i.e. XFF or HTTP Forwarded data) to the request.

A sender address extracted from the proxy identification data matching the sender address extracted from the sender data 540 indicates that there exists no not reported intermediate node between sender and first reporting proxy (i.e. first proxy that adds XFF or HTTP Forwarded data to the request). In case the extracted sender addresses do not match, step 1204 may use the sender side captured receiver data of the message (i.e. the portion of the communication endpoint data 542 captured by the sender side agent), the sender address extracted from the captured receiver-side communication message and data from the topology model to identify not reported intermediate nodes between the sender and the first reported proxy entity. First, topology nodes corresponding to the sender side captured receiver network address and to the sender address extracted from the communication message may be fetched and appended to the intermediate topology node identifier list 560 of the currently processed communication trace node, as those topology nodes represent the network entities to which the sender sent the message and from which the first reported proxy element received the message.

Afterwards, step 1204 may analyze the topology recorded communication paths between the topology node with the network address to which the sender sent the message and the topology node with the network address from which the first reported proxy received the message. In case there is one unambiguous communication path between both topology nodes, the topology nodes involved in this communication path may also be appended to the intermediate topology node identifier 560. As an example, the sender side reported receiver may have network address "A", the network address of the sender reported by the first reported proxy may be "X". Topology data shows that "A" communicates with node "B" and node "C", node "C" communicates only with "D", node "D" communicates with node "X", and there is no other communication path between "A" and "X" than via "C" and "D". In this case, nodes "C" and "D" may be inserted into the in intermediate topology node identifier list 560 between nodes "A" and "X".

Following step 1205 checks if the data describing intermediate nodes extracted by step 1201 contains data describing a next intermediate sender node. In case no data for a next intermediate sender node is available, step 1212 is executed which checks if data for the last intermediate node is available. Such data may be available for proxies reporting according to the HTTP Forwarded Extension standard, as this defines, next to a "Forwarded For" header which contains data describing the network node from which a proxy received a message, a "Forwarded By" header which contains data describing the proxy that received the message. Step 1212 may e.g. check if a "Forwarded By" header is available in the server-side captured communication message and may in this case execute step 1213, which analyzes the network address provided by the "Forwarded By" header in combination with the receiver side reported sender address (i.e. sender network address in communication endpoint data 552 of the receiver data 550) and the topology model to infer the existence of unreported intermediate node and to identify topology nodes corresponding to those unreported intermediate node as described in step 1204.

After step 1212 or in case no data describing the last intermediate node is available, the process ends with step 1214.

In case step 1205 finds data for a next intermediate sender node, step 1206 is executed which fetches the topology node corresponding to the network address of the next intermediate node. In case no matching topology node is found, step 1208 is executed which handles the unavailable topology entity as described in FIG. 10. If otherwise a matching topology was found by step 1206, step 1209 is executed which uses data describing the communication activity and the topology node, like reported port mapping data, to find a more specific topology node. As an example, the matching topology node may identify a host computer system and step 1209 may identify the topology node describing the process running on the host computer that provides the proxy service that was used to forward the message. Afterwards, step 1209 may update the currently processed communication trace node and the inferred topology model 106 according to its findings. A detailed description of the processing performed by step 1209 can be found in FIG. 13. After step 1208 or 1209 the process continues with step 1206 which determines if data describing another next sender node is available.

Coming now to FIG. 13 which describes the process that uses topology and transaction-related monitoring data to determine for a network address of an intermediate node (e.g. proxy or load balancer node) if a process running on the host computing system identified by the network address can be identified that provides the used intermediate node service.

The process starts with step 1300 when a topology node representing an intermediate node reported by a transaction trace was identified. Following decision step 1301 determines whether the currently analyzed topology node represents a dedicated traffic dispatcher entity. A dedicated traffic dispatcher entity is a network node that does not operate a conventional operating system on which processes may be executed, but a virtualized or concrete entity restricted to a traffic dispatching functionality. Examples are Amazon Elastic Load Balancer® for virtualized entities or the F5 BIG-IP® load balancer for dedicated hardware appliances. In case the currently analyzed topology node represents a dedicated traffic dispatcher entity, no process level data is available and the process ends with step 1302. Step 1301 may use the entity type 503 of the topology node to determine if it represents a dedicated traffic dispatcher entity.

In case the currently analyzed topology node is no dedicated traffic dispatcher entity but a host computing system, step 1303 is executed which determines if in addition to the network address data of the intermediate node, also port data is available that describes the port which was used by the intermediate node to send or receive a message. Such port data may be available if intermediate nodes report forwarding activity according to the specification of the HTTP Forwarded Extension.

In case port data is available, step 1304 is executed which uses the port data to identify a process level entity executed on the previously identified host computing system. Step 1304 may also consider whether the provided port identifies a process or a container and in case a container is identified, use captured container port mapping data to identify the corresponding process executed inside the container. After the topology node representing the process that provides the traffic dispatching or proxy service was identified by step 1304, step 1304 may further analyze the type-specific additional data 505 describing the process to verify if the process provides a traffic dispatcher or proxy service. Step 1304 may analyze captured command line, executable name or configuration data of the process. An example for software-based traffic dispatcher or proxy services that are executed as processes on an operating system is the HAProxy software product.

In case no port data is available, step 1305 is executed which uses topology reported process and container data and reported process level network mapping data as e.g. extracted from configuration data of identified traffic dispatcher and proxy processes in combination with heuristics to identify the process level entity that provided the used traffic dispatching/proxy service. Step 1305 may determine the number of traffic dispatcher or proxy processes running on the host computing system. In case there is only one such process, this process may be notified as used traffic dispatching or proxy process. In case there are more than one matching processes, monitored network communication activities of those processes may be analyzed to select those processes that had a network connection with an adjacent node in the traffic dispatcher/proxy chain during the execution of the request. In case there is only one such traffic dispatcher/proxy process, it may be notified by step 1305 as used traffic dispatching or proxy process. Otherwise, step 1305 may indicate that no process level entity was found.

Step 1306 is executed after step 1304 or 1305 and checks whether a traffic dispatching or proxy process was identified. In case none was identified, the process ends with step 1309. Otherwise, step 1307 is executed which updates the currently processed communication trace node 560 to describe the usage of the identified traffic dispatcher/proxy process. Step 1307 may e.g. replace in the intermediate topology identifier list 560 the topology identifier identifying the host computing system executing the traffic dispatcher/proxy process with the topology identifier of the identified traffic dispatcher/proxy process. Afterwards, step 1308 is executed which may, in case a process was identified for which it was unknown that it provides a traffic dispatcher/proxy service, update the inferred topology model 106 to describe this new finding. The process then ends with step 1309.

Referring now to FIG. 14, which describes the processing of sender and receiver endpoint data as e.g. available in communication endpoint data 542 of sender data 540 and in communication endpoint data 552 of receiver data 550 of a communication trace node 530. The process starts with step 1400 when a pair of sender and receiver network endpoint data is received. Subsequent step 1401 checks if the sender and receiver endpoint data are equal, which indicates that the receiver endpoint as seen from the sender side is equal to the receiver endpoint reported by the receiver and that the sender endpoint as seen from the receiver is equal to the sender endpoint reported by the receiver. In case sender and receiver endpoint data are equal, the process ends with step 1403.

Otherwise, step 1402 is executed which determines if sender and receiver endpoint data indicate a single intermediate node. A single intermediate node is indicated when the receiver endpoint reported by the sender side is equal to the sender endpoint reported by the receiver side. This indicates that the sender sent its message to a specific network node that is different from the receiver and the receiver received the message from this specific network node. Therefore, this situation indicates that only one intermediate node forwarded the message from the sender to the receiver.

Step 1405 is executed in case step 1402 indicates a single intermediate node. Step 1405 queries the reported topology model 105 for a network node entity (e.g. host computing system running an operating system or dedicated traffic dispatcher) with a network address matching the network address of the single intermediate node identified by step 1402. Step 1405 may also consider sender side network restrictions, like virtual private cloud or container network configurations affecting the network nodes that are visible for the sender and only consider those network nodes that are visible for the query of the topology model.

In case no topology node with matching network address is found, step 1407 is executed which handles a reported network address for which no topology node was found as described in FIG. 10.

In case a matching topology node was found, step 1408 is executed which updates the currently processing communication trace node 530 by adding the topology identifier of the identified topology node to the intermediate topology node identifier list 560. In addition, processing as described in FIG. 13 may be executed to identify the intermediate node on a process level. In addition, the inferred topology model may be updated to describe that the identified intermediate topology node provides a traffic dispatching/proxy service. After step 1407 or 1408 the process ends with step 1409.

In case step 1404 determined that multiple intermediate nodes routed the message from the sender to the receiver (i.e. receiver network address seen from the sender side is not equal to sender network address seen from the receiver side), step 1410 is executed which uses the reported topology model to determine an unambiguous path between the reported endpoints, by e.g. analyzing communication activity described in the reported topology model to determine if there exists only one communication path between sender and receiver. In case such an unambiguous path exists, step 1412 is executed which updates the currently analyzed transaction communication node 530, e.g. by appending the topology identifiers of the topology nodes on the identified path to its intermediate topology node identifier list 560. In addition, step 1412 may update the inferred topology model 106 by adding data indicating that all topology entities on the identified path provide a traffic dispatching/proxy service. The process ends with step 1409 after step 1412 or if no unambiguous path was found by step 1410.

Coming now to FIG. 15, which conceptually describes a possible usage transaction trace and topology data that was improved by a transaction/topology inference processing to improve the quality of an automated causality and root cause detection process for identified performance, functionality and resource usage anomalies.

The process starts with step 1500 when continuous monitoring of transaction execution and architecture topology of a computing environment, like e.g. a data center, is started. A monitoring server 101 may be installed and started during step 1501. Afterwards, agents, like transaction agents 150, OS agents 151 and cloud/virtualization agents 152 are installed to components of the computing environment that should be monitored. Some portions of step 1501 may be performed manually, other portions, like the injection of transaction agents 150 into processes may be performed automatically. The installed agents may be configured to send monitoring data to the monitoring server. Afterwards, the agents may be started.

The monitoring server 101 may in parallel receive transaction trace data 1502 and topology data 1504. Received topology data may be used to update 1505 the reported topology model 105, while received transaction trace data may be used in step 1503 by a transaction/topology inference processor 109 to infer unknown topology elements, to improve the inferred topology model 106 and to enhance the received transaction data as described before.

Following step 1507 analyzes performance and functional behavior data of incoming transaction trace data and resource usage and functionality of topology entities to identify anomalies and locate those anomalies in the topology model.

Subsequent step 1508 uses inference enhanced transaction trace data and data from the inferred topology model to estimate causal relationships between identified anomalies and to estimate a set of anomalies that may be the root cause for other anomalies. The data gained by the transaction/topology inference process helps to improve this causal correlation of anomalies because it extends the knowledge base used by the analysis. As an example, anomaly detection may detect that the execution time of a certain type of a transaction increased, but there is no evidence explaining this change on monitored processes involved into the execution of the transaction. Transaction/topology inference may have revealed that messages used to execute the transaction are routed via a certain proxy process, and resource usage monitoring data of the host computing system running the proxy process shows that CPU usage of this host computing system has peaked during the execution of the transaction that showed the performance anomaly. Automated root cause detection may use this additional data to identify the CPU peak at the host computing system as the root cause for the performance degradation of the transaction executions.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring transactions executing in a distributed computing environment, comprising:
receiving, by a topology processor, topology data from one or more agents, wherein the topology data describes computing resources comprising the distributed computing environment and the one or more agents are instrumented in the computing resources;
constructing, by the topology processor, a topology model using the topology data, wherein the topology model includes topology entities which collectively describe a network topology of the computing resources;
receiving, by an inference processor, transaction trace data captured by a given agent of the one or more agents, wherein the transaction trace data identifies a given transaction being executed between a sender application and a receiver application and includes a performance metric for the given transaction;
identifying, by the inference processor, a particular computing resource of the computing resources which executes at least a portion of the given transaction;
determining, by the inference processor, a presence of a given topology entity in the topology model, wherein the given topology entity in the topology model corresponds to the particular computing resource of the computing resources, and wherein determining the presence of the given topology entity in the topology model includes extracting a network address for the particular computing resource of the computing resources from the transaction trace data and querying the topology model for topology entities having a network address that matches the extracted network address for the particular computing resource of the computing resources;
updating, by the inference processor, the topology model with information for the given topology entity in the topology model, wherein the updating of the topology model occurs in response to a determination that the given topology entity in the topology model is absent from the topology model; and
updating, by the inference processor, the transaction trace data with identification data for the given topology entity in the topology model.

2. The computer-implemented method of claim 1 wherein the particular computing resource of the computing resources is one of a host computing device, an operating system on a host computing device, and a process run by an operating system of a host computing device.

3. The computer-implemented method of claim 1 further comprising:
extracting, by the inference processor, the receiver application from the transaction trace data, wherein the sender application resides on a host sender computer and the receiver application resides on a host receiver computer;

determining, by the inference processor, a presence of a given topology entity in the topology model, wherein the given topology entity in the topology model supports the receiver application residing on the host receiver computer; and updating, by the inference processor, the topology model with information for the given topology entity in the topology model, wherein the updating of the topology model occurs in response to a determination that the given topology entity in the topology model is absent from the topology model.

4. The computer-implemented method of claim 1 further comprising:

identifying, by the inference processor, at least one intermediate node from the transaction trace data, wherein the at least one intermediate node from the transaction trace data is disposed in a network between the sender application and the receiver application and the given transaction is executed in part by the at least one intermediate node from the transaction trace data;

determining, by the inference processor, a presence of a given topology entity in the topology model, wherein the given topology entity in the topology model corresponds to the at least one intermediate node from the transaction trace data; and updating, by the inference processor, the topology model with information for the given topology entity in the topology model, wherein the updating of the topology model occurs in response to a determination that the given topology entity in the topology model is absent from the topology model.

5. The computer-implemented method of claim 1 further comprising:

determining whether the given topology entity in the topology model can be monitored with an agent of the one or more agents using a network address for the given topology entity in the topology model, wherein the determining of whether the given topology entity in the topology model can be monitored is in response to a determination that the given topology entity in the topology model is absent from the topology model; and notifying a system administrator about the given topology entity in the topology model in response to the determination that the given topology entity in the topology model can be monitored with the agent of the one or more agents using the network address for the given topology entity in the topology model.

6. The computer-implemented method of claim 1 further comprising identifying, by an anomaly detector, abnormal execution of the given transaction and analyzing the abnormal execution of the given transaction in view of the updated topology model and in view of the updated transaction trace data.

7. A computer-implemented method for monitoring transactions executing in a distributed computing environment, comprising:

receiving, by a topology processor, topology data from one or more agents, wherein the topology data describes computing resources comprising the distributed computing environment and the one or more agents are instrumented in the computing resources;

constructing, by the topology processor, a topology model using the topology data, wherein the topology model includes topology entities which collectively describe a network topology of the computing resources;

receiving, by an inference processor, transaction trace data captured by a given agent of the one or more agents, wherein the transaction trace data identifies a given transaction being executed between a sender application and a receiver application and includes a performance metric for the given transaction;

identifying, by the inference processor, at least one intermediate node from the transaction trace data, wherein the at least one intermediate node from the transaction trace data is disposed in a network between the sender application and the receiver application and the given transaction is executed in part by the at least one intermediate node from the transaction trace data;

determining, by the inference processor, a presence of a given topology entity in the topology model, wherein the given topology entity in the topology model corresponds to the at least one intermediate node from the transaction trace data, and wherein determining the presence of the given topology entity in the topology model includes extracting a network address for the particular computing resource of the computing resources from the transaction trace data and querying the topology model for topology entities having a network address that matches the extracted network address for the particular computing resource of the computing resources;

updating, by the inference processor, the topology model with information for the given topology entity in the topology model, wherein the updating of the topology model occurs in response to a determination that the given topology entity in the topology model is absent from the topology model; and updating, by the inference processor, the transaction trace data with identification data for the given topology entity in the topology model.

8. The computer-implemented method of claim 7 further comprising determining, by the inference processor, a process that handled the given transaction on the at least one intermediate node from the transaction trace data, wherein the determining of the process that handled the given transaction occurs in response to a determination that the given topology entity in the topology model is present in the topology model.

9. The computer-implemented method of claim 7 further comprising receiving a portion of the topology data from an operating system (OS) agent instrumented in an operating system of a computing device, wherein the topology data identifies the operating system, identifies the computing device, and identifies processes handled by the operating system.

10. The computer-implemented method of claim 9 further comprising monitoring containers and capturing container port mapping data, wherein the topology data includes the container port mapping data and the container port mapping data specifies a relationship between a port and a process executing in a container.

11. The computer-implemented method of claim 7 further comprising receiving a portion of the topology data from a cloud/virtualization agent, wherein the cloud/virtualization agent is interfaced with a cloud management system and the topology data identifies type and functionality of virtualized entities in the distributed computing environment.

12. The computer-implemented method of claim 7 wherein the transaction trace data includes network addresses for the at least one intermediate node from the transaction trace data extracted from a message exchanged between the sender application and the receiver application.

13. The computer-implemented method of claim 7 wherein the transaction trace data includes information extracted from an X-Forwarded-For (XFF) Hypertext Transfer Protocol (HTTP) header field.

14. The computer-implemented method of claim 7 further comprising:
    extracting, by the inference processor, the receiver application from the transaction trace data, wherein the sender application resides on a host sender computer and the receiver application resides on a host receiver computer;
    determining, by the inference processor, a presence of a given topology entity in the topology model, wherein the given topology entity in the topology model supports the receiver application residing on the host receiver computer; and
    updating, by the inference processor, the topology model with information for the given topology entity in the topology model, wherein the updating of the topology model occurs in response to a determination that the given topology entity in the topology model is absent from the topology model.

15. The computer-implemented method of claim 7 wherein the updating of the topology model further comprises adding the given topology entity to the topology model.

16. The computer-implemented method of claim 7 further comprising:
    determining whether the given topology entity in the topology model can be monitored with an agent of the one or more agents using a network address for the given topology entity in the topology model, wherein the determining of whether the given topology entity in the topology model can be monitored is in response to a determination that the given topology entity in the topology model is absent from the topology model; and
    notifying a system administrator about the given topology entity in the topology model in response to the determination that the given topology entity in the topology model can be monitored with the agent of the one or more agents using the network address for the given topology entity in the topology model.

17. The computer-implemented method of claim 7 further comprising identifying, by an anomaly detector, abnormal execution of the given transaction and analyzing the abnormal execution of the given transaction in view of the updated topology model and in view of the updated transaction trace data.

18. A computer-implemented method for monitoring transactions executing in a distributed computing environment, comprising:
    receiving, by a topology processor, topology data from one or more agents, wherein the topology data describes computing resources comprising the distributed computing environment and the one or more agents are instrumented in the computing resources;
    constructing, by the topology processor, a topology model using the topology data, wherein the topology model includes topology entities which collectively describe a network topology of the computing resources;
    receiving, by an inference processor, transaction trace data captured by a given agent of the one or more agents, wherein the transaction trace data identifies a given transaction being executed between a sender application and a receiver application and includes a performance metric for the given transaction;
    extracting, by the inference processor, the receiver application from the transaction trace data, wherein the sender application resides on a host sender computer and the receiver application resides on a host receiver computer;
    determining, by the inference processor, a presence of a given topology entity in the topology model, wherein the given topology entity in the topology model supports the receiver application residing on the host receiver computer, and wherein determining the presence of the given topology entity in the topology model includes extracting a network address for the particular computing resource of the computing resources from the transaction trace data and querying the topology model for topology entities having a network address that matches the extracted network address for the particular computing resource of the computing resources;
    updating, by the inference processor, the topology model with information for the given topology entity in the topology model, wherein the updating of the topology model occurs in response to a determination that the given topology entity in the topology model is absent from the topology model; and
    updating, by the inference processor, the transaction trace data with identification data for the given topology entity in the topology model.

19. The computer-implemented method of claim 18 further comprising receiving a portion of the topology data from an operating system (OS) agent instrumented in an operating system of a computing device, wherein the topology data identifies the operating system, identifies the computing device, and identifies processes handled by the operating system.

20. The computer-implemented method of claim 19 further comprising monitoring containers and capturing container port mapping data, wherein the topology data includes the container port mapping data and the container port mapping data specifies a relationship between a port and a process executing in a container.

21. The computer-implemented method of claim 18 further comprising receiving a portion of the topology data from a cloud/virtualization agent, wherein the cloud/virtualization agent is interfaced with a cloud management system and the topology data identifies type and functionality of virtualized entities in the distributed computing environment.

22. The computer-implemented method of claim 18 wherein the transaction trace data includes a network address for the host receiver computer and determines the presence of the given topology entity in the topology model using the network address for the host receiver computer.

23. The computer-implemented method of claim 18 wherein the transaction trace data includes a network address of a host sender computer and a port used by the sender application on the host sender computer, and further comprises determining whether a process corresponding to the sender application was executed in a container using the port used by the sender application on the host sender computer.

24. The computer-implemented method of claim 18 wherein the transaction trace data includes a network address of the host receiver computer and a port used by the receiver application on the host receiver computer, and further comprises:

determining process data for the receiver application using the given topology entity in the topology model; and determining whether a process corresponding to the receiver application was executed in a container using the port used by the receiver application on the host receiver computer.

25. The computer-implemented method of claim 18 further comprising:

identifying, by the inference processor, at least one intermediate node from the transaction trace data, wherein the at least one intermediate node from the transaction trace data is disposed in a network between the sender application and the receiver application and the given transaction is executed in part by the at least one intermediate node from the transaction trace data;

determining, by the inference processor, a presence of a given topology entity in the topology model, wherein the given topology entity in the topology model corresponds to the at least one intermediate node from the transaction trace data; and updating, by the inference processor, the topology model with information for the given topology entity in the topology model, wherein the updating of the topology model occurs in response to a determination that the given topology entity in the topology model is absent from the topology model.

26. The computer-implemented method of claim 18 further comprising:

determining whether the given topology entity in the topology model can be monitored with an agent of the one or more agents using a network address for the given topology entity in the topology model, wherein the determining of whether the given topology entity in the topology model can be monitored is in response to a determination that the given topology entity in the topology model is absent from the topology model; and notifying a system administrator about the given topology entity in the topology model in response to the determination that the given topology entity in the topology model can be monitored with the agent of the one or more agents using the network address for the given topology entity in the topology model.

27. The computer-implemented method of claim 26 further comprising:

identifying another topology entity in the topology model, wherein the other topology entity in the topology model has a network address the same as the given topology entity in the topology model and an entity type indicating a virtualized host system; and notifying a system administrator to place an operating system (OS) agent at the virtualized host system.

28. The computer-implemented method of claim 18 further comprising identifying, by an anomaly detector, abnormal execution of the given transaction and analyzing the abnormal execution of the given transaction in view of the updated topology model and in view of the updated transaction trace data.

* * * * *